US008811819B2

(12) United States Patent
Kazawa et al.

(10) Patent No.: US 8,811,819 B2
(45) Date of Patent: Aug. 19, 2014

(54) OPTICAL MULTIPLEXING TERMINAL DEVICE, WAVELENGTH MULTIPLEXING PASSIVE OPTICAL NETWORK SYSTEM AND DOWNLINK WAVELENGTH TRANSMISSION METHOD

(75) Inventors: Tohru Kazawa, Kokubunji (JP); Norihiro Sakamoto, Chigasaki (JP); Masaki Ohira, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 99 days.

(21) Appl. No.: 13/378,281

(22) PCT Filed: Jun. 16, 2009

(86) PCT No.: PCT/JP2009/060935
§ 371 (c)(1),
(2), (4) Date: Dec. 14, 2011

(87) PCT Pub. No.: WO2010/146658
PCT Pub. Date: Dec. 23, 2010

(65) Prior Publication Data
US 2012/0093509 A1    Apr. 19, 2012

(51) Int. Cl.
*H04J 14/00* (2006.01)
*H04J 14/02* (2006.01)

(52) U.S. Cl.
USPC ............... 398/68; 398/43; 398/48; 398/95

(58) Field of Classification Search
USPC .................................. 398/68, 70, 72, 58
See application file for complete search history.

(56) References Cited

U.S. PATENT DOCUMENTS 6,411,410 B1   6/2002 Wright et al.
7,512,341 B2 * 3/2009 Kazawa et al. ............ 398/71
(Continued)

FOREIGN PATENT DOCUMENTS

| JP | 10-247896   | 9/1998 |
| JP | 2006-165953 | 6/2006 |
| JP | 2008-172351 | 7/2008 |

OTHER PUBLICATIONS

Gigabit-capable Passive Optical Networks (G-PON): transmission convergence layer specification; Recommendation ITU-T G.984.3; Mar. 2008; pp. i-v, 1-135.

(Continued)

*Primary Examiner* — Ken Vanderpuye
*Assistant Examiner* — Amritbir Sandhu
(74) *Attorney, Agent, or Firm* — Foley & Lardner LLP

(57) ABSTRACT

Provided is a passive optical network system, wherein the electric power to be consumed is reduced on the basis of the quantity of signal to be transmitted downstream in a WDM-PON where signals having different transmission rates for wavelengths are mixed. In the passive optical network system, an OLT (200) and a plurality of ONUes (300) are connected by an optical fiber network including an optical splitter (100) and a plurality of optical fibers (110 and 120). The OLT (200) indicates to the ONUes (300) the wavelength to be used, in addition to the timing for transmission to the ONUes (300). A format for signal transmission from the OLT (200) to the ONUes (300) comprises both the region, in which the timing for transmission to the ONUes (300) indicated by the OLT (200) to the ONUes (300) is stored, and the region, by which the wavelength to be used in the communication in the direction from the OLT (200) to the ONUes (300) is indicated.

7 Claims, 20 Drawing Sheets

(56) References Cited

U.S. PATENT DOCUMENTS

| | | | |
|---|---|---|---|
| 7,616,892 B2 * | 11/2009 | Suzuki et al. | 398/72 |
| 7,627,246 B2 * | 12/2009 | Sorin et al. | 398/63 |
| 7,680,414 B2 * | 3/2010 | Kazawa et al. | 398/67 |
| 7,725,031 B2 * | 5/2010 | Kazawa et al. | 398/71 |
| 7,873,277 B2 * | 1/2011 | Kazawa et al. | 398/68 |
| 8,014,672 B2 * | 9/2011 | Suzuki et al. | 398/69 |
| 8,467,684 B2 * | 6/2013 | Kazawa et al. | 398/67 |
| 8,532,491 B2 * | 9/2013 | Sakamoto et al. | 398/72 |
| 2006/0120378 A1 * | 6/2006 | Usuki et al. | 370/395.4 |
| 2006/0120724 A1 | 6/2006 | Ishimura | |
| 2008/0166127 A1 * | 7/2008 | Kazawa et al. | 398/79 |
| 2008/0317469 A1 * | 12/2008 | Kazawa et al. | 398/71 |
| 2010/0290783 A1 * | 11/2010 | Kazawa et al. | 398/66 |
| 2011/0091213 A1 * | 4/2011 | Kawaza et al. | 398/68 |
| 2012/0106958 A1 * | 5/2012 | Sakamoto et al. | 398/58 |

OTHER PUBLICATIONS

PCT International Search Report and Written Opinion on application No. PCT/JP2009/060935 dated Aug. 18, 2009; 7 pages.

* cited by examiner

| ONU-ID | DOWNLINK WAVELENGTH TYPE | Start | End |
|---|---|---|---|
| 1 | λd1 | 12 | 497 |
| 5 | λd1 | 510 | 1619 |
| 5 | λd2 | 12 | 359 |
| (FREE SLOT) | λd2 | 360 | 8099 |
| 2 | λd3 | 12 | 11351 |
| 4 | λd3 | 11364 | 16199 |
| 4 | λd4 | 12 | 8122 |
| 3 | λd4 | 8135 | 45383 |
| (FREE SLOT) | λd4 | 45384 | 161999 |

FIG.11 (a)

| ONU-ID | DOWNLINK WAVELENGTH TYPE | Start | End |
|---|---|---|---|
| 5 | λd1 | 12 | 497 |
| 4 | λd1 | 510 | 1619 |
| 4 | λd2 | 12 | 359 |
| (FREE SLOT) | λd2 | 360 | 8099 |
| 1 | λd3 | 12 | 11351 |
| 3 | λd3 | 11364 | 16199 |
| 3 | λd4 | 12 | 8122 |
| 2 | λd4 | 8135 | 45383 |
| (FREE SLOT) | λd4 | 45384 | 161999 |

| PROCESSING ORDER | ONU-ID | ALLOCATED BYTE LENGTH |
|---|---|---|
| 1 | 1 | 486 (bandwidth 30Mbit/s equivalent (correctly 31.104Mbit/s)) |
| 2 | 5 | 1458 (bandwidth 90Mbit/s equivalent (correctly 93.3120Mbit/s)) |
| 3 | 2 | 11340 (bandwidth 700Mbit/s equivalent (correctly 725.76Mbit/s)) |
| 4 | 4 | 12960 (bandwidth 800Mbit/s equivalent (correctly 829.44Mbit/s)) |
| 5 | 3 | 32400 (bandwidth 2Gbit/s equivalent (correctly 2073.6Mbit/s)) |

OPTICAL MULTIPLEXING TERMINAL DEVICE, WAVELENGTH MULTIPLEXING PASSIVE OPTICAL NETWORK SYSTEM AND DOWNLINK WAVELENGTH TRANSMISSION METHOD

TECHNICAL FIELD

The present invention relates to an optical multiplexing terminating device, a wavelength multiplexing passive optical network system and a downlink wavelength transmission method, and more particularly to an optical multiplexing terminating device in a passive optical network system in which plural optical network terminating devices such as subscriber connecting devices share an optical transmission line, the wavelength multiplexing passive optical network system and a downlink wavelength transmission method.

BACKGROUND ART

To transmit and receive a large volume of image signal or data via a communication network, the higher speed and wider bandwidth of the communication network have been carried out in an access network for connecting the subscriber to the communication network, whereby a Passive Optical Network system (hereinafter referred to as a PON) has been introduced as defined in the recommendation G.984.3 of the International Telecommunication Union (hereinafter referred to as ITU-T). The PON is a system in which an Optical Line Terminator (hereinafter referred to as an OLT) connected to an upper-level communication network and an Optical Network Unit (hereinafter referred to as an ONU) accommodating plural subscriber terminals (PCs or telephones) are connected via an optical passive network including a trunk optical fiber, an optical splitter and plural branch optical fibers. Specifically, in a communication form, a signal from the terminal (PC or the like) connected to each ONU, or an optical signal, is passed from the branch optical fiber via the optical splitter to the trunk optical fiber for optical (time division) multiplexing and sent to the OLT, and the OLT performs a communication process for the signal from each ONU and transmits the signal to the upper-level communication network, or the other ONU connected to the OLT.

The development and introduction of the PONs have been made including a system dealing with the low speed signal of 64 kbit/sec, a Broadband PON (BPON) for transmitting and receiving the ATM cell of fixed length at the maximum rate of about 600 Mbit/sec, an Ethernet PON (EPON) for transmitting and receiving the variable length packet of Ethernet (registered trademark) at the maximum rate of about 1 Gbit/sec, and a Gigabit PON (GPON) dealing with the faster signal of about 2.4 Gbit/sec, as standardized in the ITU-T recommendations G.984.3. Further, the implementation of the fast PON capable of dealing with the signal from 10 Gbit/sec to 40 Gbit/sec will be sought in the future. As means for implementing these fast PONs, the multiplexing methods for plural signals such as Time Division Multiplexing (TDM) for making the time division multiplexing, Wavelength Division Multiplexing (WDM) for making the wavelength division multiplexing, and Code Division Multiplexing (CDM) for making the code division multiplexing have been investigated. The current PON adopts the TDM, and the GPON, for example, uses different wavelengths for the uplink (from ONU to OLT) signal and the downlink (from OLT to ONU) signal, in which the communication between the OLT and each ONU is configured to allocate the communication time of signal to each ONU. Also, the conventional configuration of dealing with the fixed length signal has changed to the configuration of dealing with the burst, variable length signal (burst signal) easy to handle more various types of signals (voice, image, data and so on).

On the other hand, in a WDM method, plural waves having different wavelengths for both the uplink signal and the downlink signal are connected between the OLT and the ONU, and each ONU receives and transmits a specific wavelength to make the communication. By allocating an individual wavelength from the OLT to each ONU to make the communication, the communication band can be remarkably improved. For example, one implementation method for a WDM-PON capable of connecting a maximum of 32 ONUs is that M downlink wavelengths (one wavelength for each of uplink and downlink is allocated to each ONU for 32 wavelengths) are allocated, that is, the number of wavelengths for use in one PON is made double the maximum number of connected ONUs. Herein, in the WDM-PON capable of connecting a maximum of 32 ONUs, following the idea of the conventional TDM-PON, there is an idea that the PON is economically constructed by limiting the number of uplink wavelengths to n (32 wavelengths or less) to reduce the number of expensive optical components. At this time, the uplink signal is transmitted by making the time division multiplexing of the transmit signals from the plural ONUs, whereby it should be noticed that a ranging procedure or the dynamic bandwidth assignment as will be described later is required in the WDM-PON.

In the above form of each PON, the distance from the OLT to each ONU is different to install the ONUs in the subscriber houses scattered at various locations. That is, since the length of optical fiber (transmission distance) including the trunk optical fiber and the branch optical fiber from the OLT to each ONU varies, the transmission delay (delay amount) between each ONU and the OLT varies, whereby even if each ONU transmits the signal at different timing, there is possibility that the optical signals outputted from the ONUs may collide and interfere on the trunk optical fiber. Therefore, in each PON, the distance between the OLT and the ONU is measured, using a technique called the ranging as defined in chapter 10 of G.984.3, for example, and then the delay of output signal from each ONU is adjusted so that the signals outputted from the ONUs may not collide.

Further, using a technique called the Dynamic Bandwidth Assignment (hereinafter referred to as DBA), the OLT decides the band of signal permitted to transmit to the ONU, based on a transmission request from each ONU, and in consideration of the delay amount measured by the above ranging, specifies the transmission timing to each ONU so that the optical signals from the ONUs may not collide and interfere on the trunk optical fiber. That is, the PON is configured to operate the communication in the state where the timing of signal transmitted and received between the OLT and each ONU is managed within the system.

In transmitting and receiving the signal between the OLT and each ONU, the signal from the ONU to the OLT has a guard time for prevention of interference having a maximum of 12 bytes at the top of the signal from each ONU, a preamble for use to decide the signal identification threshold of a receiver within the OLT and extract the clock, a burst overhead byte called a delimiter for identifying the breakpoint of the received signal, and a control signal (sometimes called an overhead or header) of the PON, which are added to the data (sometimes called a payload), so that the OLT can identify and process the signal from each ONU multiplexed on the trunk optical fiber, as defined in chapter 8.3.3 of G.984.2, for example. Since each data is burst data of variable length, a header called a GEM (G-PON Encapsulation method) header for processing the variable length data is also added to the top of each data.

On the other hand, the signal from the OLT to each ONU has a frame alignment pattern for identifying the top, a PLOAM area for transmitting the monitor, maintenance and control information, and an overhead (sometimes called a header) called a grant indication area for indicating the signal transmission timing of each ONU, which are added to the time division multiplexed data addressed to each ONU, at the top of the signal transmitted from the OLT to each ONU, so that each ONU can identify and process the signal from the OLT. A GEM header for processing the variable length data is added to the data addressed to each ONU that is multiplexed, like the signal from the ONU. The OLT specifies the uplink transmission permission timing (transmission start (Start) and end (Stop)) of each ONU in bytes to each ONU, using the grant indication area. This transmission permission timing is called the grant. And if each ONU transmits the data addressed to the OLT at the permission timing, these are optically (time division) multiplexed on the optical fiber, and received by the OLT.

PRIOR ART DOCUMENTS

Non-Patent Documents

Non-patent document 1: ITU-T recommendation G.984.3

DISCLOSURE OF THE INVENTION

Problems that the Invention is to Solve

As described above, the development and introduction of the PON have been made from the one processing the low speed signal to the one processing the high speed signal as in the transition from the BPON to the GPON. By the way, it is well known that an optical module or LSI that is an element component for providing a signal transmission function of the PON consumes larger power as the transmission rate is higher. For example, the optical module tends to reserve the required bandwidth by passing a larger amount of current at higher transmission rate to attain the higher transmission rate. Also, it is well known that a digital signal processing LSI with the CMOS technology consumes the power almost proportional to the rate of clock for use. From the above circumstances, it is easily foreseen in the future that a larger consumption power tends to be spent as the transmission rate is higher. On the other hand, even though there is tendency that the end user asks for the higher transmission rate, the end user does not always want the high transmission rate. In a time period when the communication is not performed, of course, the high transmission rate is not required, but during the communication, especially in the data transmission on the internet access, it is natural that the high transmission rate is demanded only at the moment of downloading or uploading a large volume of image data or a large file, but the high transmission rate is not required during the perusal of the content or execution of work. Also, in a TCP protocol for use in the data transmission, if a certain number of packets are received, it is required to return a validation signal packet, whereby on the data transmission side, the subsequent data is not transmitted until the validation signal packet is received. As a conclusion, it is apparent that the data traffic is in the form of the quite high burst transmission even during the data transmission. Nevertheless, the optical module or LSI composing the PON device is operative even in the time period when data is not substantially transmitted to consume the power, causing a remarkable waste of power. Therefore, there is a demand for the PON system in which when the end user traffic is small, the transmission is performed at low transmission rate, while when the end user traffic is large, the transmission is performed at high transmission rate.

In particular, it is imagined that the traffic having very great bandwidth gaps from a large capacity of video download to a control packet of short time may flow downstream from the OLT to the ONUs.

In the light of the above-mentioned problems, it is an object of the invention to provide a passive optical network system that can reduce a waste of the electric power to be consumed as much as possible on the basis of the end user traffic in the downlink direction.

Means for Solving the Problems

The above-mentioned problems can be solved by making the downstream signal communication using a transmission rate (transmission clock rate) different for each wavelength in the downstream signal of the WDM-PON in which the number of downlink wavelengths is limited to n (32 wavelengths or less) as described above, and using the wavelength of small transmission rate in the downstream signal of the ONU with small requested bandwidth.

More specifically, the OLT transmits the signals to the ONUs in ascending order of the requested bandwidth by sequentially using the wavelengths in ascending order of the transmission rate among plural transmission wavelengths that the OLT itself has as a transmission function. At this time, the wavelength to be allocated must be selected so that the bandwidth allocated to each ONU is narrower than a maximum bandwidth through which transmission is enabled at the allocated wavelength. For example, using four downlink wavelengths, the transmission rates for use at those wavelengths are such that wavelength 1=100 Mbit/s, wavelength 2=500 Mbit/s, wavelength 3=1 Gbit/s, and wavelength 4=10 Gbit/s in order. Herein, when the bandwidth of 600 Mbit/s is allocated to a certain ONU, the wavelength 1 or 2 is not used even if there is a margin of bandwidth allocation in the wavelength 1 or 2, but the wavelength of the wavelength 3=1 Gbit must be selected as the allocation wavelength.

There is the following reason for this. In the case where the ONU has one variable WDM filter and operates by selecting the receive wavelength based on an instruction from the OLT, the variable WDM filter allows the light of only one wavelength to be transmitted at a time. Trying to receive the two wavelengths of the wavelength 1=100 Mbit/s and the wavelength 2=500 Mbit/s in the above example, the variable WDM filter is sought to receive the lights of the wavelengths 1 and 2 at the same time, but the signals of two the wavelengths are mingled to make the correct reception of signals impossible.

The above restriction does not interfere with the use of two wavelengths in time division for one ONU in the follow way. At this time, an instance of allocating the wavelengths 3 and 4 in time division to the ONU having a bandwidth request of 1 Gbit/s is considered. Specifically, information of 500 Mbit/s is transmitted in the latter half of the DBA period using the wavelength 3. Further, information of 500 Mbit/s is transmitted in the former one-twentieth of the downlink bandwidth allocation period using the wavelength 4 (corresponding to the bandwidth of 10 Gbit/s. For this wavelength allocation in time division, it is unnecessary that the variable WDM filter receives the lights of wavelengths 3 and 4 at the same time. This wavelength allocation in time division can be realized in good visibility by allocating bands to the ONUs in ascending order of the requested bandwidth by sequentially using wavelengths in ascending order of transmission rate, as described above.

Subsequently, a method of specifying the operating wavelength from the OLT to the ONO will be described below. The OLT provides an area for notifying the downlink transmission wavelength and the timing to the ONU. The ONU carries out the downlink communication using the specified wavelength from the OLT at a transmission rate determined at that wavelength. When the ONU makes the communication at lower transmission rate, the clock frequency to be supplied to the downlink signal processing part of the LSI is decreased, whereby the electric power to be consumed in the ONU is reduced.

According to the first solving means of the present invention, there is provided an optical multiplexing terminal device in a wavelength multiplexing passive optical network system in which the optical multiplexing terminal device connected to an upper-level communication network and a plurality of optical network terminal devices for accommodating subscriber terminals are connected via an optical fiber network having an optical splitter and a plurality of optical fibers, communication in a direction from the optical multiplexing terminal device to the optical network terminal devices being made using a plurality of wavelengths fewer in number than a total number of the optical network terminal devices connected to the optical multiplexing terminal device, the optical multiplexing terminal device comprising:

a transmission timing table for storing, for each optical network terminal device ID, a type of downlink wavelength, a start position of transmission timing, and an end position of transmission timing;

an allocated byte length table for storing an allocated byte length indicating an amount of data allocated to each optical network terminal device for each optical network terminal device ID; and a control part for allocating the type of downlink wavelength and the transmission timing to each optical network terminal device by referring to the transmission timing table and the allocated byte length table;

wherein the control part decides a quantity of signal permitted to transmit to each of the optical network terminal devices at every fixed period, with a total sum of transmission rates corresponding to the plurality of wavelengths for use in the communication in the direction from the optical multiplexing terminal device to the optical network terminal devices as an upper limit, selects the wavelength in which the corresponding transmission rate is the slowest from among the wavelengths of which bandwidth allocation is not completed and allocates the transmission timing to the optical network terminal devices in ascending order of the decided quantity of signal permitted to transmit, and stores, for the optical network terminal device ID, a start position of transmission timing and an end position of transmission timing along with a type of downlink wavelength for the selected wavelength in the transmission timing table;

the control part creates a downlink grant indication, successively including a data set having the type of downlink wavelength, the start position of transmission timing and the end position of transmission timing for the optical network terminal device ID of each entry by referring to the transmission timing table, and creates a frame payload including transmit data from the start position to the end position of transmission timing to the designated optical network terminal device for each data set of the downlink grant indication; and the control part transmits the downlink grant indication to each optical network terminal device with the wavelength selected by each optical network terminal device in accordance with a downlink grant indication transmitted at a previous transmission period, and subsequently transmits a downlink signal including the frame payload at the wavelength with the type of downlink wavelength designated by the downlink grant indication by successively switching the wavelengths.

According to the second solving means of the present invention, there is provided a wavelength multiplexing passive optical network system in which an optical multiplexing terminal device connected to an upper-level communication network and a plurality of optical network terminal devices for accommodating subscriber terminals are connected via an optical fiber network having an optical splitter and a plurality of optical fibers, communication in a direction from the optical multiplexing terminal device to the optical network terminal devices being made using a plurality of wavelengths fewer in number than a total number of the optical network terminal devices connected to the optical multiplexing terminal device, the optical multiplexing terminal device comprising:

a transmission timing table for storing, for each optical network terminal device ID, a type of downlink wavelength, a start position of transmission timing, and an end position of transmission timing;

an allocated byte length table for storing an allocated byte length indicating an amount of data allocated to each optical network terminal device for each optical network terminal device ID; and a control part for allocating the type of downlink wavelength and the transmission timing to each optical network terminal device by referring to the transmission timing table and the allocated byte length table;

wherein the control part decides a quantity of signal permitted to transmit to each of the optical network terminal devices at every fixed period, with a total sum of transmission rates corresponding to the plurality of wavelengths for use in the communication in the direction from the optical multiplexing terminal device to the optical network terminal devices as an upper limit, selects the wavelength in which the corresponding transmission rate is the slowest from among the wavelengths of which bandwidth allocation is not completed and allocates the transmission timing to the optical network terminal devices in ascending order of the decided quantity of signal permitted to transmit, and stores, for the optical network terminal device ID, a start position of transmission timing and an end position of transmission timing along with a type of downlink wavelength for the selected wavelength in the transmission timing table;

the control part creates a downlink grant indication, successively including a data set having the type of downlink wavelength, the start position of transmission timing and the end position of transmission timing for the optical network terminal device ID of each entry by referring to the transmission timing table, and creates a frame payload including transmit data from the start position to the end position of transmission timing to the designated optical network terminal device for each data set of the downlink grant indication; and the control part transmits the downlink grant indication to each optical network terminal device with the wavelength selected by each optical network terminal device in accordance with a downlink grant indication transmitted at a previous transmission period, and subsequently transmits a downlink signal including the frame payload at the wavelength with the type of downlink wavelength designated by the downlink grant indication by successively switching the wavelengths.

According to the third solving means of the present invention, there is provided a downlink wavelength transmission method in a wavelength multiplexing passive optical network system in which an optical multiplexing terminal device connected to an upper-level communication network and a plurality of optical network terminal devices for accommodating subscriber terminals are connected via an optical fiber network having an optical splitter and a plurality of optical fibers, communication in a direction from the optical multiplexing terminal device to the optical network terminal devices being made using a plurality of wavelengths fewer in number than a total number of the optical network terminal devices connected to the optical multiplexing terminal device, the optical multiplexing terminal device comprising:

a transmission timing table for storing, for each optical network terminal device ID, a type of downlink wavelength, a start position of transmission timing, and an end position of transmission timing;

an allocated byte length table for storing an allocated byte length indicating an amount of data allocated to each optical network terminal device for each optical network terminal device ID; and a control part for allocating the type of downlink wavelength and the transmission timing to each optical network terminal device by referring to the transmission timing table and the allocated byte length table;

wherein the control part decides a quantity of signal permitted to transmit to each of the optical network terminal devices at every fixed period, with a total sum of transmission rates corresponding to the plurality of wavelengths for use in the communication in the direction from the optical multiplexing terminal device to the optical network terminal devices as an upper limit, selects the wavelength in which the corresponding transmission rate is the slowest from among the wavelengths of which bandwidth allocation is not completed and allocates the transmission timing to the optical network terminal devices in ascending order of the decided quantity of signal permitted to transmit, and stores, for the optical network terminal device ID, a start position of transmission timing and an end position of transmission timing along with a type of downlink wavelength for the selected wavelength in the transmission timing table;

the control part creates a downlink grant indication, successively including a data set having the type of downlink wavelength, the start position of transmission timing and the end position of transmission timing for the optical network terminal device ID of each entry by referring to the transmission timing table, and creates a frame payload including transmit data from the start position to the end position of transmission timing to the designated optical network terminal device for each data set of the downlink grant indication; and the control part transmits the downlink grant indication to each optical network terminal device with the wavelength selected by each optical network terminal device in accordance with a downlink grant indication transmitted at a previous transmission period, and subsequently transmits a downlink signal including the frame payload at the wavelength with the type of downlink wavelength designated by the downlink grant indication by successively switching the wavelengths.

Effect of the Invention

With the invention, in a PON where plural signals having different downlink transmission rates are mixed in time division and operated, it is possible to realize a passive optical network system capable of reducing the electric power to be consumed as much as possible on the basis of an end user traffic.

BRIEF DESCRIPTION OF THE DRAWINGS

FIG. 10($b$) is a memory organization view showing an organization example of the allocated byte length table.

FIG. 11($a$) is a memory organization view showing an organization example of a transmission timing table.

FIG. 11($b$) is a memory organization view showing an organization example of the transmission timing table.

FIG. 15($b$) is a view showing a transmitting example (second period) of the downstream grant at each wavelength.

FIG. 17 is a view of an allocated byte length table of rearranging data of the allocated byte length table of FIG. 10($a$) in ascending order of an allocated byte length.

BEST MODE FOR CARRYING OUT THE INVENTION

The configuration and operation of a PON and a wavelength allocation method for realizing this means according to this embodiment will be described below using the drawings.

1. Passive Optical Network System

In the following explanation, supposing a PON in which the wavelength is allocated to each of five ONUs connected to an OLT and a wavelength division multiplexing of data is made, an example of dynamically allocating wavelengths (λd1, λd2, λd3, λd4) capable of transmitting data of 100 Mbit/s (correctly 103.68 Mbit/s, the length of time slot being 1620 bytes), 500 Mbit/s (correctly 518.4 Mbit/s, the length of time slot being 8100 bytes), 1 Gbit/s (correctly 1036.8 Mbit/s, the length of time slot being 16200 bytes), and 10 Gbit/s (correctly 10368 Mbit/s, the length of time slot being 162000 bytes) to downstream data from the OLT to the ONUs will be described below. Also, though wavelengths allocated to uplink data from the ONUs to the OLT are wavelengths (λu1, λu2, λu3, λu4) that are dynamically allocated, the wavelengths are mainly allocated to the downlink data in this embodiment. The details are not described in the following. These numerical values are only one example, in which the other transmission rates may be used, and this embodiment is not limited to these numerical values. Also, four or more uplink wavelengths and five or more ONUs may be provided, or three or less uplink wavelengths and four or less ONUs may be provided.

Figure 1:
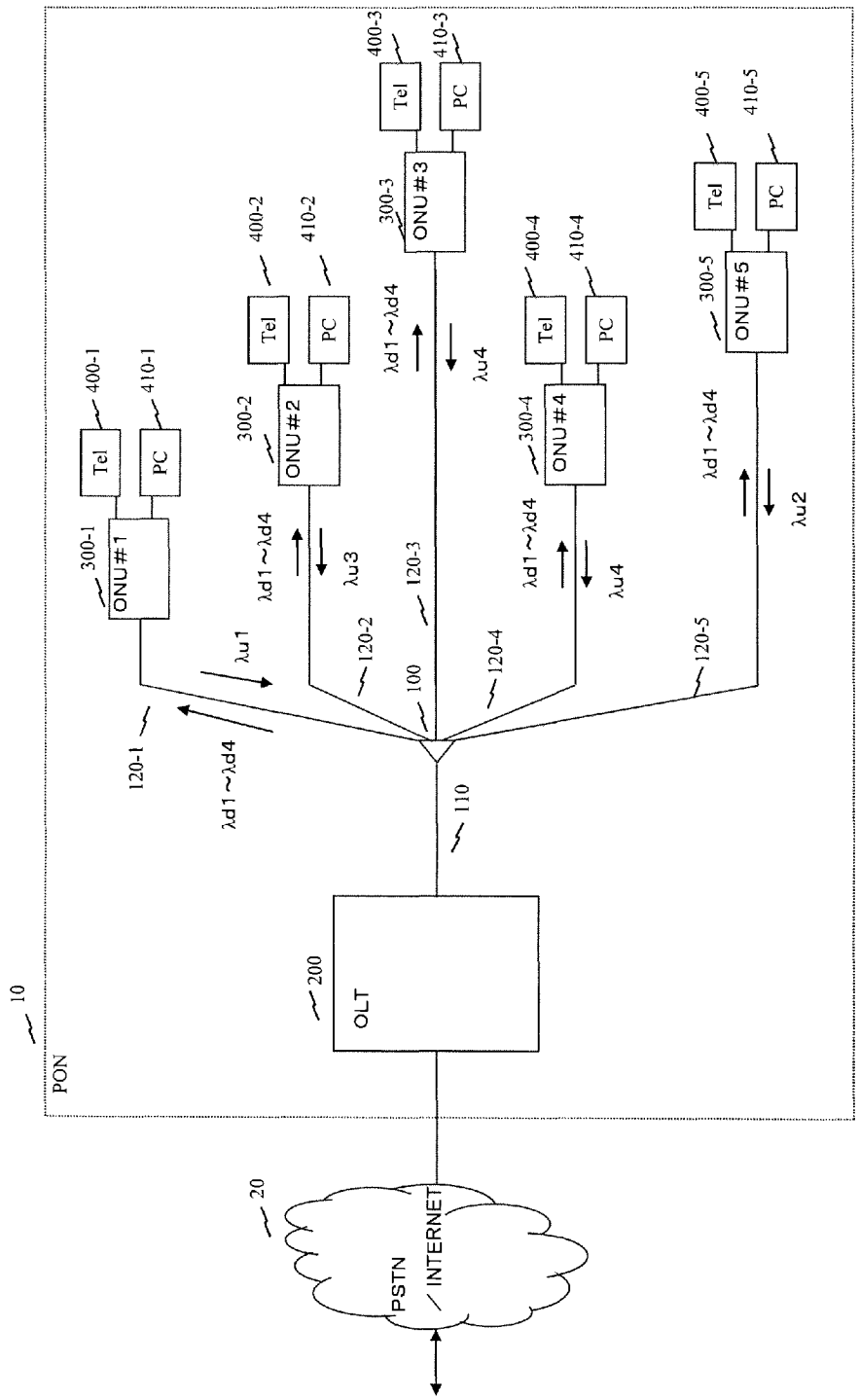
FIG. 1 is a network block diagram showing a configuration example of an optical access network using a PON.

FIG. 1 is a block diagram showing the configuration of an optical access network to which this embodiment is applied.

A PON 10, which is connected to a PSTN/internet 20, transmits or receives data. The PON 10 includes an optical splitter 100, a trunk fiber 110, branch fibers 120, an OLT 200 and ONUs 300, telephones 400, and personal computers 410. The OLT 200 is capable of connecting, for example, thirty two ONUs 300 via one trunk fibers 110, the optical splitter 100 and the branch fibers 120. In FIG. 1, the five ONUs are illustrated, each having a different operating wavelength. In an illustrated example, all the ONUs share the downstream wavelengths λu1, λu2, λu3 and λu4, which are dynamically allocated by a method as will be described later. On the other hand, taking a situation where four upstream wavelengths are shared among the five ONUs as one example, λu1 for an ONU 300-1, λu3 for an ONU 300-2, λu4 for an ONU 300-3, λu4 for an ONU 300-4, and λu2 for an ONU 300-5 are shown in the drawing. Each ONU can use the wavelengths by switching them in time division. A signal in the direction from the OLT 200 to the ONUs 300 is transmitted by making the wavelength division multiplexing of signals addressed to the respective ONUs 300. The signal received in each ONU 300 is received within the ONU 300 by selecting the wavelength directed to its own, and sent to the telephone 400 or the personal computer 410 based on an address of the signal. Also, in the direction from the ONUs 300 to the OLT 200, signals transmitted from the ONU 300-1, ONU 300-2, ONU 300-3, ONU 300-4 and ONU 300-5 are transmitted with data at the timing and wavelength indicated from the OLT 200, undergo the wavelength division multiplexing after passing through the optical splitter 100, and reach the OLT 200.

In the example of FIG. 1, the five ONUs 300 are shown in the drawing and connected to the OLT 200. The number of ONUs connected to the OLT 200 and the maximum connectable number may be appropriate.

Figure 2:
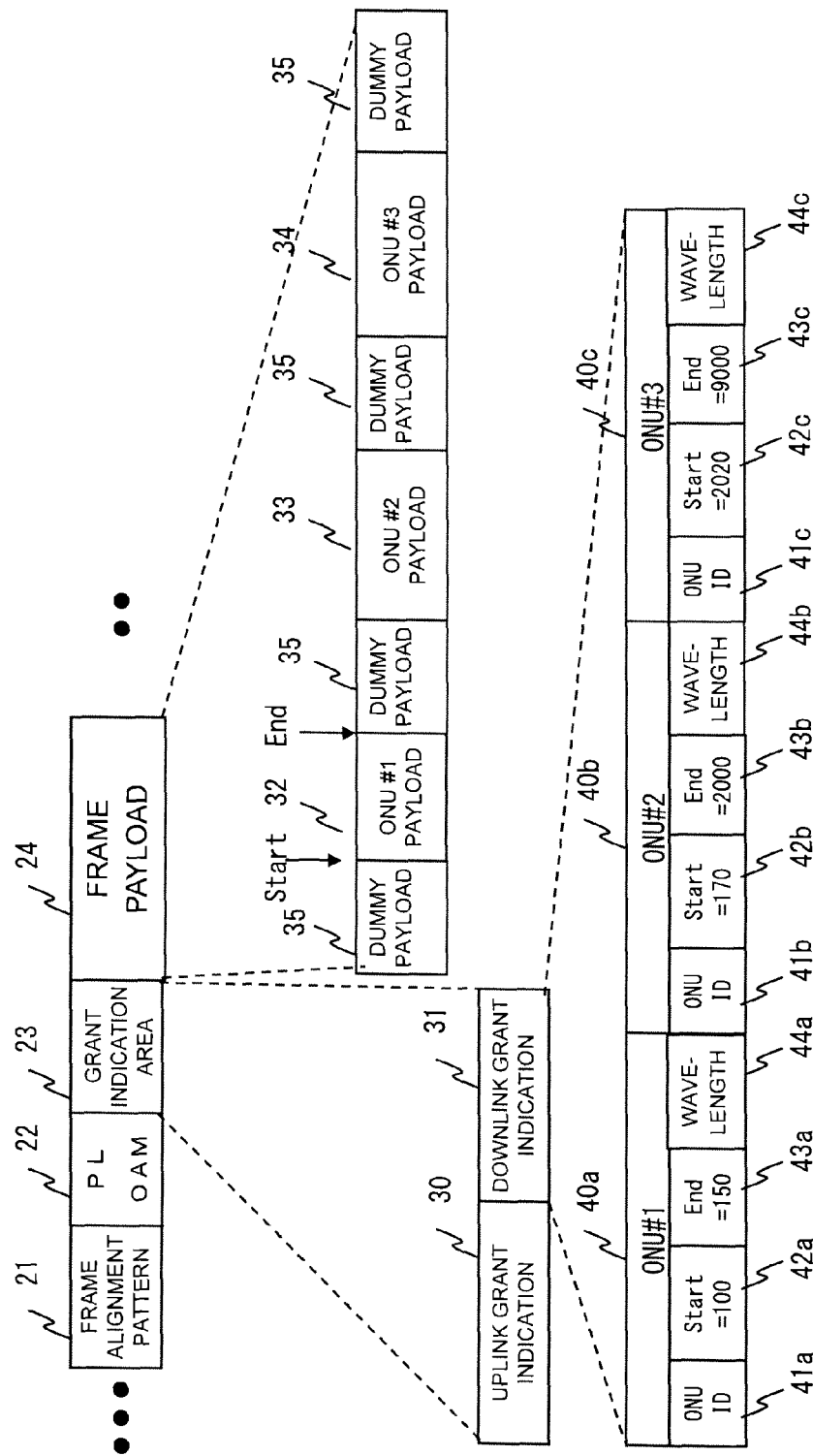
FIG. 2 is a frame organization view showing an organization example of a downstream signal from an OLT to an ONU.

FIG. 2 is a frame organization view showing a first organization example of a downstream signal.

The downstream signal (hereinafter referred to as a downstream frame, or simply a frame) employs a structure of a period of 125μ seconds as defined in the ITU-T recommendation G984.3. It includes a frame alignment pattern 21, a PLOAM (Physical Layer Operation, Administration and Maintenance) 22, a grant indication 23, and a frame payload 24. The frame alignment pattern 21 is a fixed pattern for enabling each ONU 300 to identify the top of frame with a period of 125μ seconds. The PLOAM 22 stores information that the OLT 200 uses to manage a physical layer of each ONU 300. The grant indication 23 as will be described later in detail indicates the signal transmission timing and the transmission wavelength to each ONU 300. On the other hand, the frame payload 24 stores a user signal directed from the OLT 200 to each ONU 300. The grant indication 23 further includes an upstream grant indication 30 and a downstream grant indication 31. The upstream grant indication 30 indicates the upstream signal transmission timing (grant) of each ONU 300, and more particularly, indicates the grant for each TCONT (ONU designated by an ONU-ID) that is a user signal control unit inside each ONU 300. On the other hand, the downstream grant indication 31 is not defined in the ITU-T recommendation G984.3, but is introduced to solve the problems of the invention. Specifically, for data stored in the frame payload 24 transmitted from the OLT to the ONU, the transmission start time, the transmission end time and the transmission wavelength are notified for each destination ONU number.

In FIG. 2, one organization example corresponding to the configuration as shown in FIG. 1 includes an ONU-ID #1 signal 40a for controlling the ONU 300-1, an ONU-ID #2 signal 40b for controlling the ONU-2, and an ONU-ID #3 signal 40c for controlling the ONU-3. Each ONU signal is composed of an ONU-ID 41 for identifying the ONUs, a Start 42 indicating the signal transmission start timing, an End 43 indicating the transmission end timing, and a transmission wavelength designation area 44. The transmission wavelength designation area 44 indicates which of the wavelengths λu1, λu2, λu3 and λu4 is used for the downstream signal for each ONU. The Start 42 and End 43 indicate the transmission start timing and transmission end timing of signal for each ONU. The OLT 200 periodically transmits a downstream signal including the grant indication 23 to each ONU 300, indicating how much downstream data is transferred to each ONU. This Start 42 and End 43 are information indicating at which timing to start and end the reception of data in each period during which the OLT 200 transmits the grand indication. Instead of the End 43, the data length of data to be transmitted may be designated to transmit data by the designated data length from the timing of the Start 42.

With a set of the Start 42, End 43 and transmission wavelength designated area 44, the start position, end position and transmission wavelength of an ONU #1 addressed signal payload 32 stored in the payload 24 are notified.

The OLT 200 transmits a payload in a section indicated by the Start 42 and End 43 to each ONU at the wavelength designated for each ONU in the transmission wavelength designation area 44 of the downstream grant indication 31 by switching the wavelength. The ONU 300 switches the receiving wavelength to each wavelength 44 designated in the downstream grant indication 31 and receives the downstream signal in this designated section (Start 42 and End 43). Inside the ONU 300 as will be described later, the time section and the transmission wavelength of the signal to be received by the self station are detected, using this downstream indication, and the signal with the designated transmission wavelength is received by controlling an internal optical receiving interface. In this embodiment, since the transmission rate is different for each transmission wavelength, the ONU 300 necessarily receives the signal of different transmission rate. In the following, an ONU #2 addressed signal payload 33 and an ONU #3 addressed signal payload 34 are similarly configured. In this drawing, the ONU #1 addressed signal payload 32 has a rate of 2.4 Gbit/sec, and the ONU #2 addressed signal payload 33 and the ONU #3 addressed signal payload 34 have a rate of 10 Gbit/sec as one example. Dummy payloads 35 and 36 are inserted into every turn between the ONU addressed payloads. In the case where a conventional device for continuous transmission is used for the optical receiving transmission interface of the ONU 300, when the transmission rate is changed, the time as long as from several 100 nano seconds to several micro seconds, for example, is often required to make the synchronization following the change. The signal with different wavelength has necessarily a skew due to a propagation delay difference dependent on the wavelength or a delay deflection of the transmission time of the OLT. Accordingly, when the ONU 300 switches the wavelength based on an indication of the OLT 200, the receiver modifies this skew, necessarily demanding the time for synchronization with the received signal. As a specific example of the dummy payload 35, "10" alternate that is advantageous for both the signal amplitude adjustment and the clock synchronization is optimal, but any other different value may be used. Also, in this embodiment, the length of dummy load is 12 bytes, as one example.

2. ONU

Figure 3:
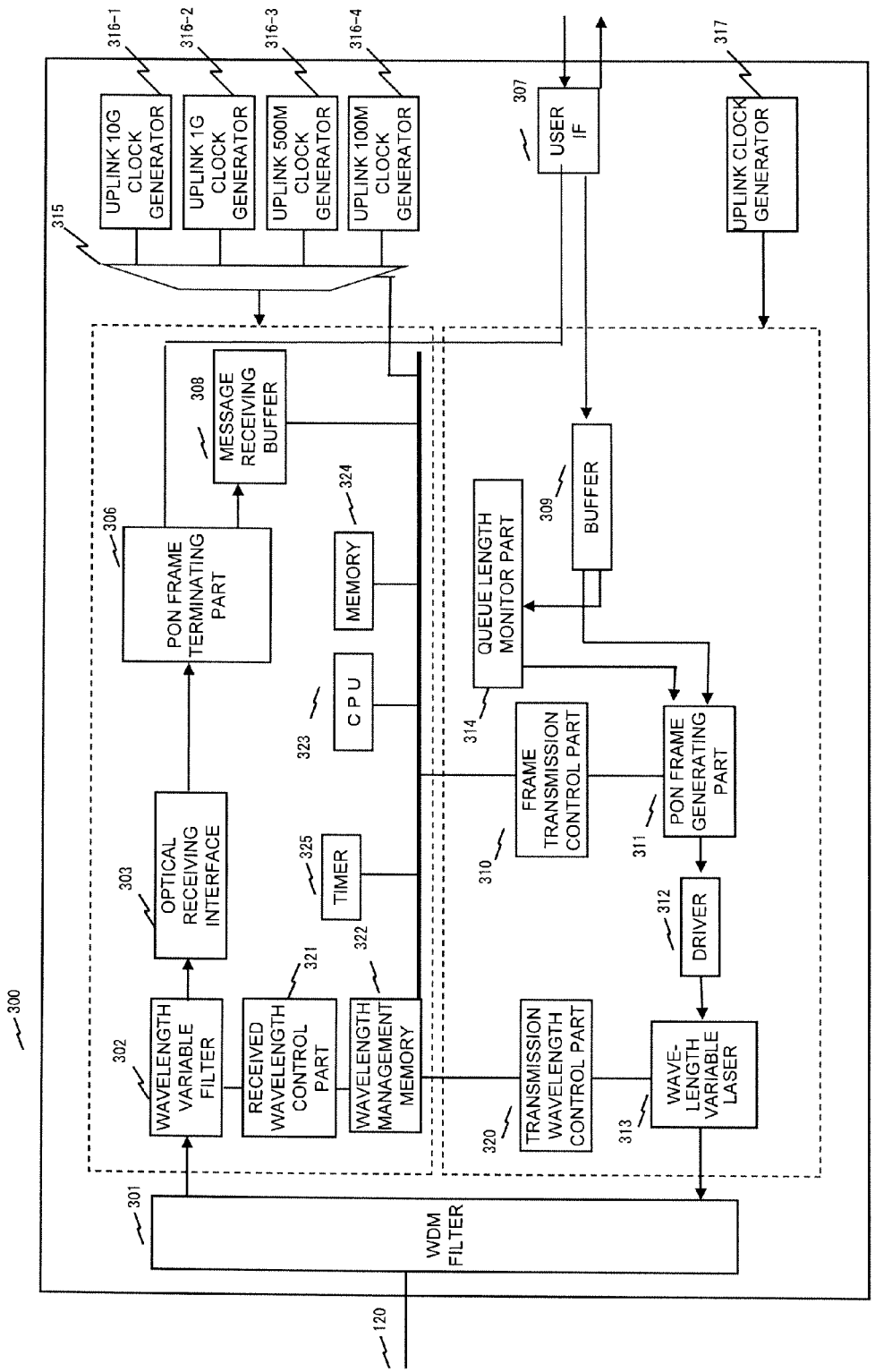
FIG. 3 is a block diagram showing a configuration example of the ONU.

FIG. 3 shows a configuration example of the ONU 300 to which this embodiment is applied.

An optical signal received from the branch fiber 120 is separated by wavelength through a WDM filter 301 and passed through a wavelength variable filter 302 to select one of the downlink wavelengths λd1 to λd4. The optical signal is converted into a digital bit sequence in an optical receiving interface 303. Then, the signal is separated as described in connection with FIG. 2 in a PON frame terminating part 306. The signals in the PLOAM area 21 and the grant indication area 22 are sent to a message receiving buffer 308 and the signal in the frame payload area 23 is sent to a user IF 307 and outputted. Also, the signal inputted from the user IF 307 is temporarily stored in a buffer 309, read under the control of a frame transmission control part 310, and assembled into a format, for example, as described in the ITU-T recommendation G.984.3, chapter 8.2 in a PON frame generating part 311. The packet buffer 309 is monitored in the use amount of buffer by a queue length monitor part 314. Buffer use amount information is stored in a PON section frame in a format, for example, as described in the ITU-T recommendation G.984.3, chapter 8.4, and passed to the OLT, and the OLT controls the grant amount to be issued based on this queue length information. The assembled signal is converted into optical signal by current driving a wavelength variable laser 313 in a driver 312 and sent through the WDM filter 301 to the branch fiber 120. A CPU 323 and a memory 324 are paired to make the monitor and control of each block within the ONU 300. For example, the CPU 323 performs the reset with the wavelengths decided beforehand in a wavelength management memory 322, for example, the downlink wavelength λd1 and the uplink wavelength λu1, as initial values, immediately after the initiation of the ONU, or immediately after the ONU is connected to the fiber. A received wavelength control part 321 sets the wavelength of the wavelength variable filter 302, based on the value stored in the wavelength management memory 322, and a transmission wavelength control part 320 sets the wavelength of the variable wavelength laser 313, based on the value stored in the wavelength management memory 322. Also, the CPU 323 sends and receives a wavelength allocation message to and from the OLT 200, using the message receiving buffer 308 and the message transmission buffer 310, while referring to a timer 325, and sets the allocated wavelength thereof in the wavelength management memory 322.

The clock for use in the ONU 300 always relies on a clock from an uplink clock generator 317 in an uplink signal block, and operates by enabling a selector 315 to select a clock 316 (100M clock for λd1, 500M clock for λd2, 1 G clock for λd3 and 10 G clock for λd4 in this example) adapted to the wavelength designated in the wavelength designation area 43 of the grant indication area 22 in a downlink signal block.

Figure 4:
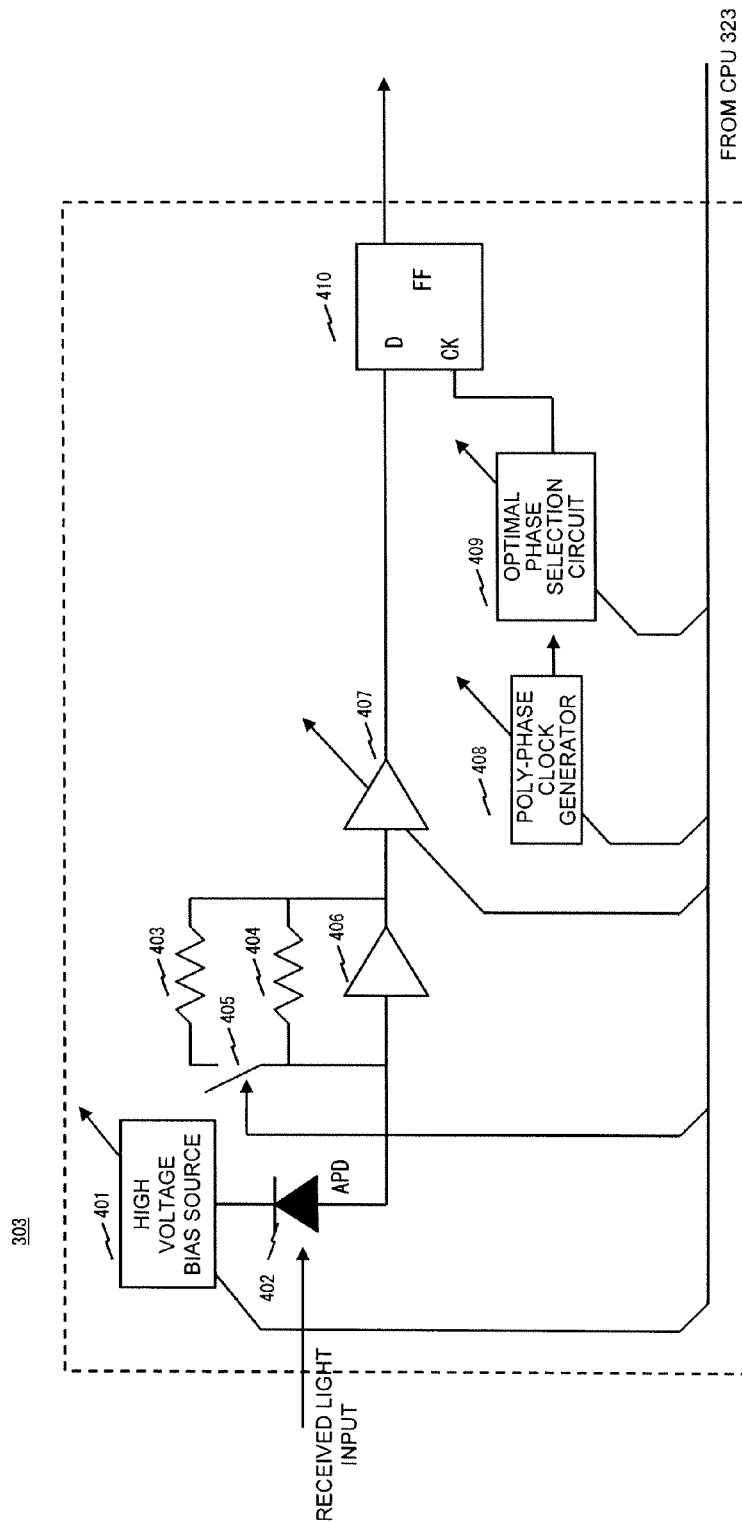
FIG. 4 is a block diagram showing a configuration example of an optical receiving interface of the ONU.

FIG. 4 shows a detailed example of the optical receiving interface 303 of FIG. 3.

An APD 402 connected to a high voltage variable bias source 401 is reversely biased at a high voltage to amplify the received optical signal owing to an avalanche effect, and convert it into electric current. With this amplification action, when a high rate signal beyond 1 Gbit/sec is inputted as a weak optical signal of about −30 dBm, data can be correctly identified. The converted current is converted into voltage by a trans-impedance amplifier composed of resistors 403 and 404 and an amplifier 406. Then, the signal amplified by a variable gain amplifier 407 is converted into a digital bit sequence by a flip-flop 410. Herein, a clock inputted into the flip-flop 410 is generated by an optimal phase selection circuit 409 that selects a clock nearest to an optimal identification point of the signal from an output of a poly-phase clock generation circuit 408. In the above configuration, the high voltage variable bias source 401 outputs a bias voltage according to the transmission rate under the control of the CPU 323 to amplify the received signal properly. Also, a switch 405 makes the selection between the resistors 403 and 404 according to the transmission rate under the control of the CPU 323, and decides a bandwidth and a trans-impedance gain. The variable gain amplifier 407 has a gain set according to the transmission rate under the control of the CPU 323. The poly-phase clock generation circuit 408 outputs a poly-phase clock of frequency according to the transmission rate under the control of the CPU 323, and the optimal phase selection circuit 409 selects the clock nearest to the optimal identification point according to the transmission rate under the control of the CPU 323.

3. OLT

Figure 5:
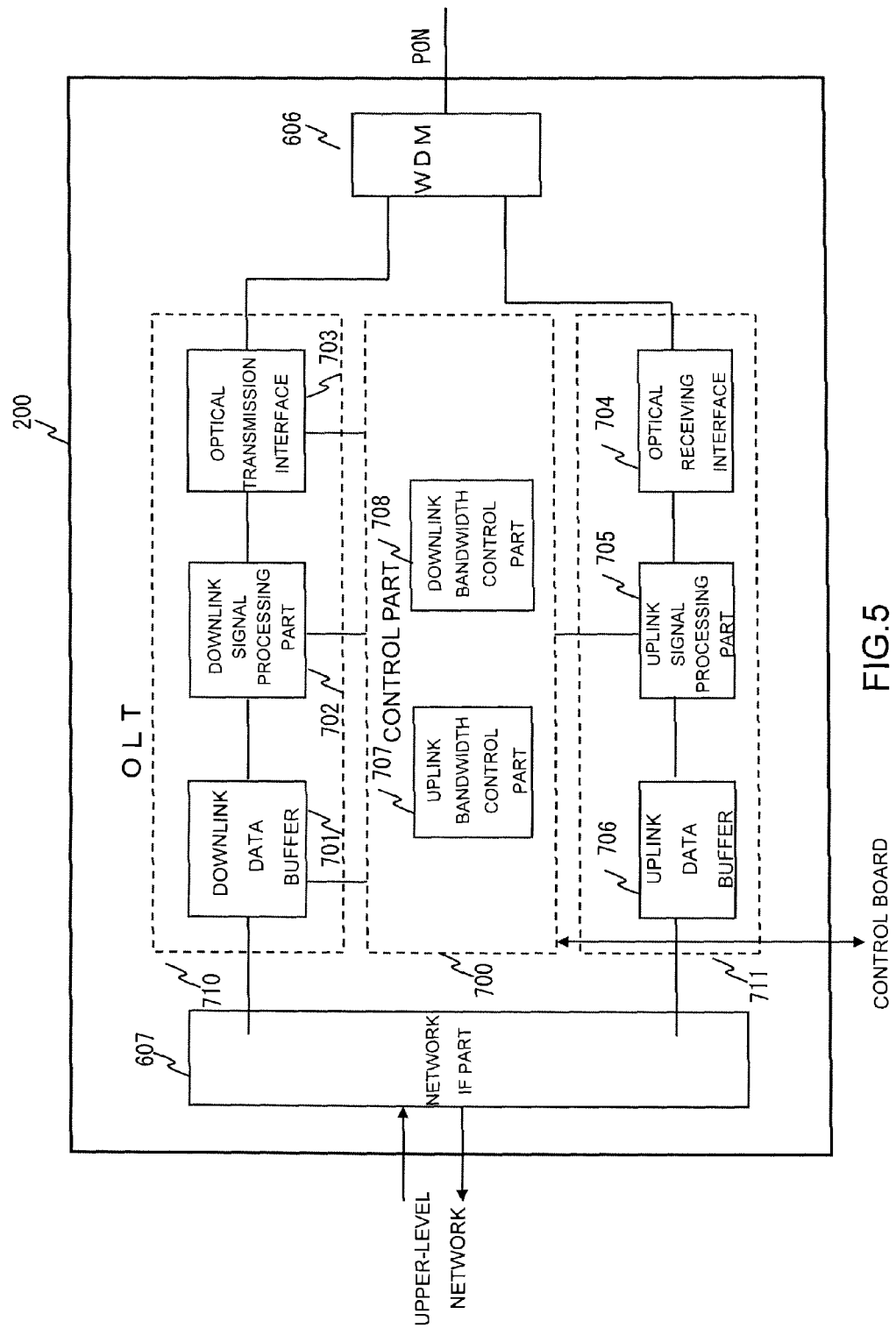
FIG. 5 is a block diagram showing a configuration example of the OLT.

FIG. 5 is a block diagram showing a configuration example of the OLT for use in the PON according to this embodiment.

The OLT 200 includes a network IF part 607, a control part 700, a transmitting part 710, a receiving part 711, and a WDM 606. The transmitting part 710 includes a downlink data buffer 701, a downlink signal processing part 702, and an optical transmitting interface 703. Also, the receiving part 711 includes an optical receiving interface 704, an uplink signal processing part 705, and an uplink data buffer 706.

The downlink data buffer 701 temporarily accumulates data received via the network IF part 607 from the upper-level network 20. The downlink signal processing part 702 performs a process required to relay the optical signal from the upper-level network 20 to the ONU 300. A downstream frame as described in connection with FIG. 2 is assembled in this block, and a downstream grant (31 of FIG. 2) outputted from a downstream bandwidth control part 708 is stored in the downstream frame by a method as will be described later. The optical transmitting interface 703 converts electrical signal into optical signal and transmits the optical signal (downlink signal) via the optical signal IF part 606 to the ONU. The optical receiving interface 704 converts the optical signal received via the optical signal IF part 606 from the ONU 300 into the electrical signal. The uplink signal processing part 705 performs a process required to relay the signal from the ONU 300 to the upper-level network 20. The uplink data buffer 706 temporarily accumulates data to be transmitted via the network IF part 607 to the upper-level network 20. The control part 700, which is connected to each of the function blocks as described above, performs various kinds of process required to make the communication (monitor and control) with the plural ONUs 300, and has a function of relaying the signal between the upper-level network 20 and the ONUs 300.

An uplink bandwidth control part 707 performs a dynamic bandwidth allocation process for deciding, at every predetermined DBA period, how large communication bandwidth is allocated to each of the ONUs 300 (TCONT) accommodated in the OLT 200 within the period. The downlink bandwidth control part 708 decides, at every predetermined period, how many signals are transferred to each of the ONUs 300 accommodated in the OLT 200 within the period. The control part 700 makes the communication with a control board (e.g., a maintenance terminal composed of PC) provided in the PON to preset control parameters (e.g., subscription terms of the ONU, contract traffic and so on) required for the control in the control part, or receive monitor information (e.g., fault occurrence situation or transmission permissible data amount to each ONU) based on a request of a maintenance person.

Each functional block of the OLT 200 as described above is realized by a firmware accumulated in the CPU or memory, by electrical parts such as an electrical/optical conversion circuit, memory or amplifier. Also, these functions may be realized by a dedicated hardware (LSI or the like) that specializes in each process.

Figure 6:
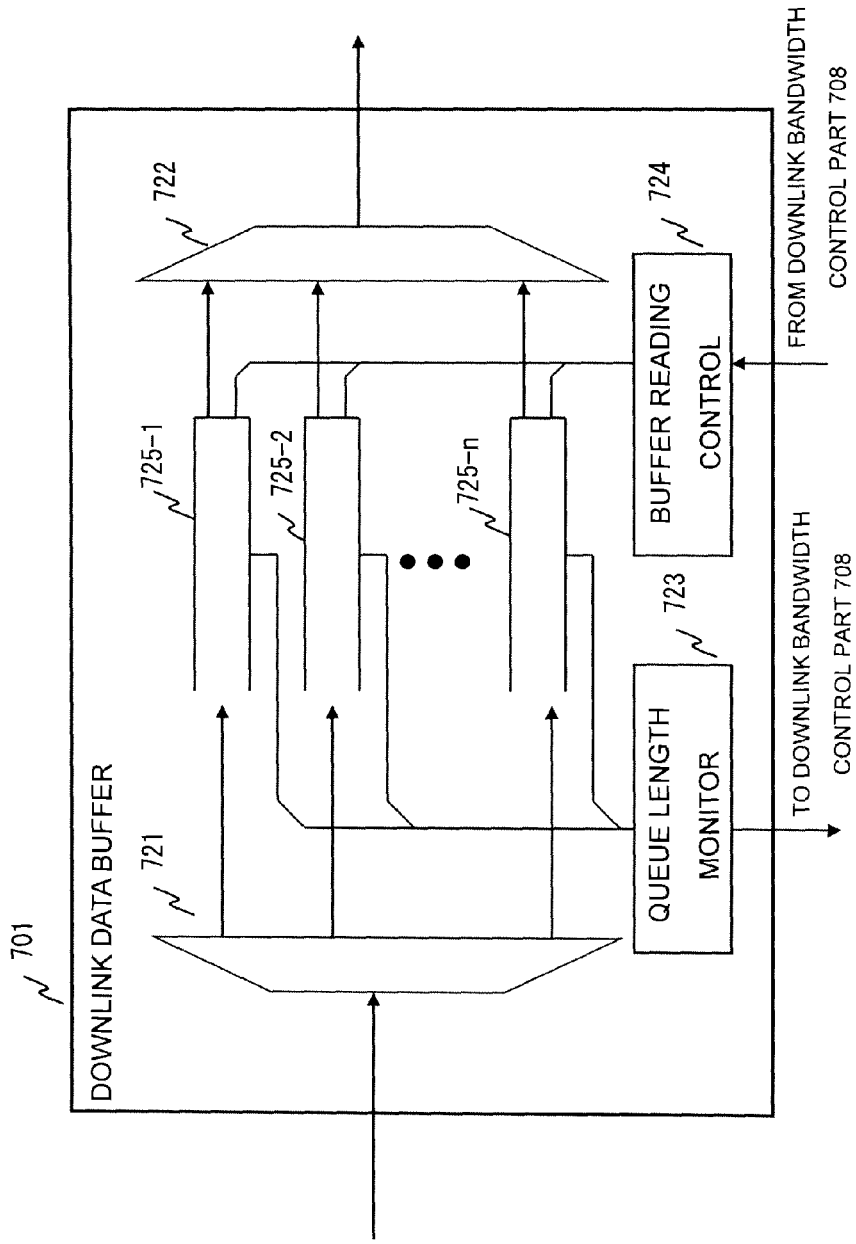
FIG. 6 is a block diagram showing a configuration example of a downlink packet buffer of the OLT.

FIG. 6 is an explanatory diagram for explaining the configuration of the downlink packet buffer 701 provided in the OLT. The downlink packet buffer 701 includes a distribution part 721, a multiplexing part 722, a queue length monitor part 723, a buffer reading control part 724, and a packet buffer 725. The data received via the network IF part 607 from the upper-level network 20 is distributed to each address ONU by referring to a label of VLAN, for example, and temporarily accumulated in the packet buffer 725 provided for each ONU. The queue length monitor part 723 monitors the queue length of each packet buffer 725 and notifies it to the downlink bandwidth control part 708. The buffer reading control part 724 reads the designated amount of data from the designated packet buffer 725 in accordance with an instruction from the downlink bandwidth control part 708, and sends it via the multiplexing part 722 to the latter stage.

Figure 7:
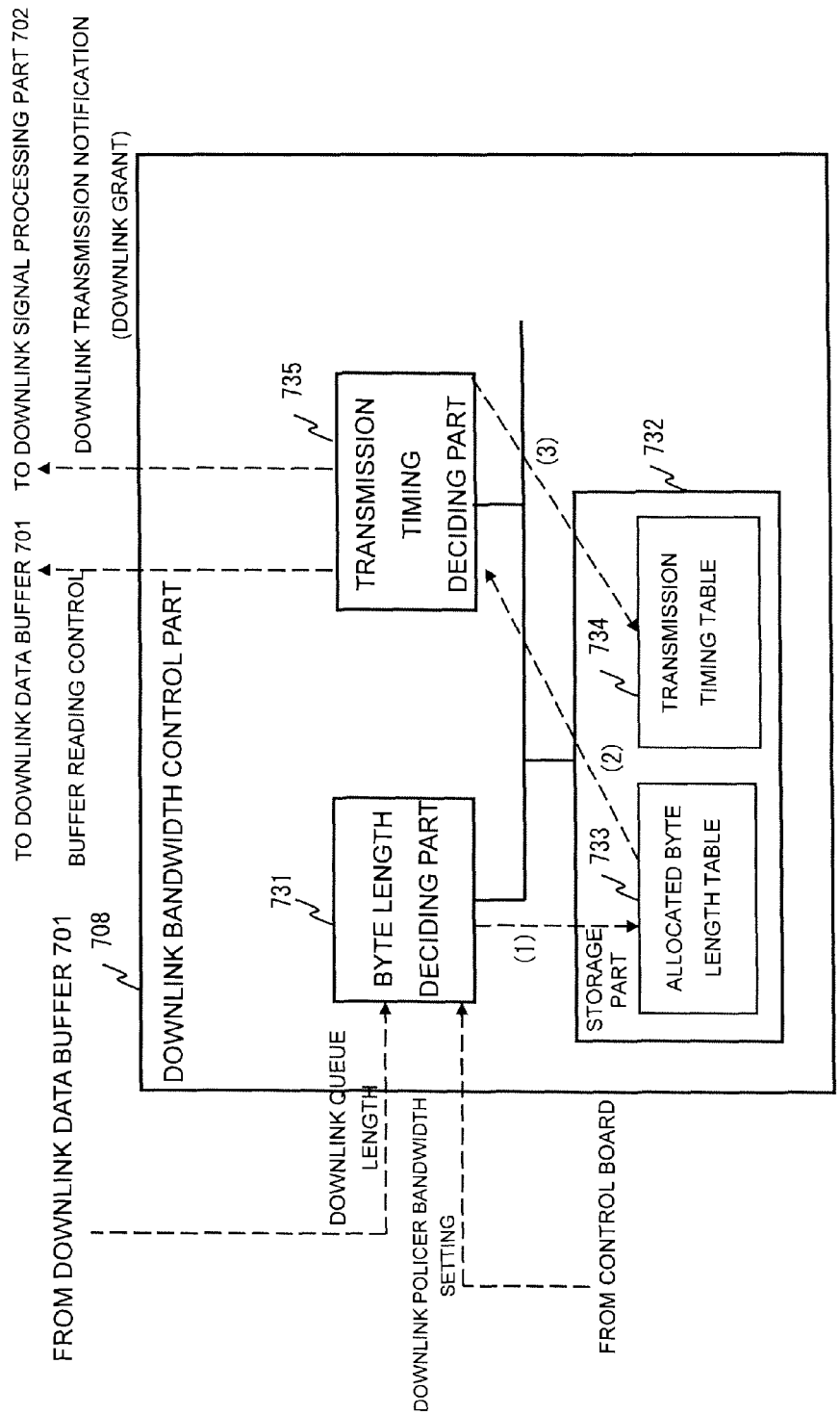
FIG. 7 is an explanatory diagram for explaining the configuration and an operation example of a control part of the OLT.

FIG. 7 is an explanatory diagram for explaining a configuration and operation example of the downlink bandwidth control part 708 provided in the OLT. A byte length deciding part 731 receives the queue length that is the amount of data directed to each ONU 300 from the queue length monitor part 723 within a downlink bandwidth control period (0.125 milliseconds in this example).

The byte length deciding part 731 has a policer bandwidth (or contract bandwidth) that is a maximum bandwidth parameter transmittable downstream to each ONU set from the control board (see FIG. 5) by the maintenance person, based on the contract. This policer bandwidth is set to restrict the downlink transmit data amount in accordance with the service contract amount of each ONU contractor, for example, and the data stored in the packet buffer 725 as described in connection with FIG. 6 can be transmitted to each ONU if it is less than or equal to a set value of the policer bandwidth, but if the data exceeds the set value of the policer bandwidth is stored, the data over the set value of the policer bandwidth can not be transmitted instantly, and is left within the packet buffer 725 until the condition that the amount of data stored in the packet buffer 725 is less than or equal to the set value of the policer bandwidth is satisfied. Based on the above restriction, specifically, based on the received queue length and the preset value of the policer bandwidth, the number of bytes (downlink communication bandwidth) to be transmitted to each ONU 300 is decided, and an allocated byte length table 733 in which the ONU-ID that is an identifier of each ONU and a byte length to be transmitted are associated is created and stored in a storage part 732 (FIG. 7: (1)).

FIGS. 10(a) and 10(b) show an organization example of the allocated byte length table 733. The allocated byte length table 733 includes an ONU-ID 901 that is the identifier of the ONU and a byte length 902 allocated to the ONU under the downlink bandwidth control.

Figure 12:
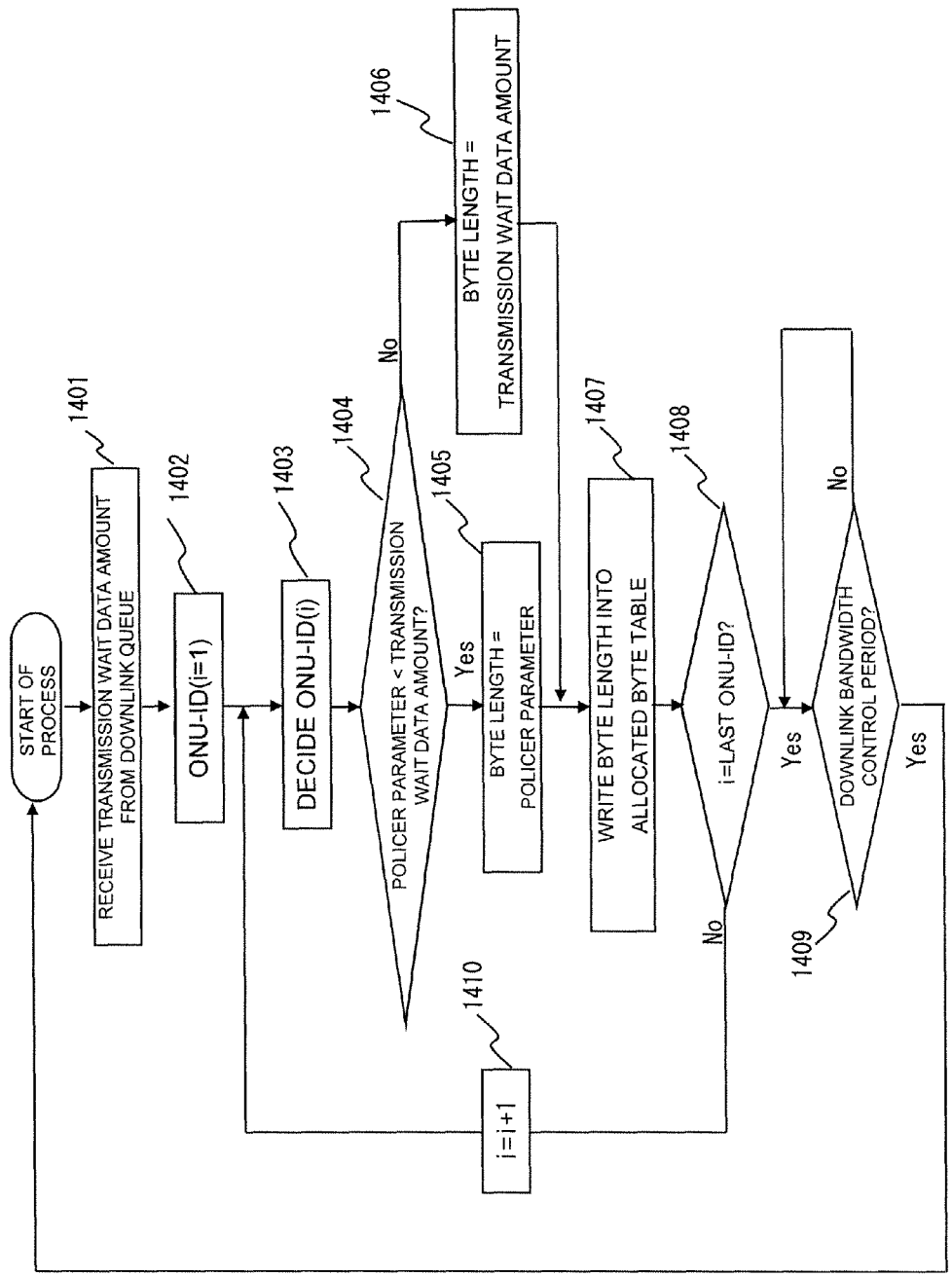
FIG. 12 is an operation flowchart showing an operation example (No. 1) of the control part of the OLT.

FIG. 12 is a flowchart for a method for deciding the byte length in the allocated byte length table 733. The method for deciding the byte length is possible in various variations, and not limited to this example. First of all, the byte length deciding part 731 receives the queue length that is the amount of data directed to each ONU from the queue length monitor part 723 (1401). The byte length deciding part 731 sets an initial value of the ONU-ID to zero (1402), and decides the ONU-ID to be processed (1403). The byte length deciding part 731 compares the transmission wait data amount with the preset contract parameter (1404), in which if the transmission wait data amount is greater than the contract parameter, it sets the contract parameter to the allocated byte length (1405), and writes the byte length into the allocated byte length table 733 (1407). Conversely, the byte length deciding part 731 compares the transmission wait data amount with the contract parameter (1404), in which if the transmission wait data amount is smaller than the contract parameter, it sets the transmission wait data amount to the allocated byte length (1406), and writes the byte length into the allocated byte length table 733 (1407). The byte length deciding part 731 performs this process for all the registered ONU-IDs (1408). And after a downlink bandwidth allocation period expires (1409), the byte length deciding part 731 collects the queue length again (1401), and performs the same process.

A transmission timing deciding part 735 reads the contents of the allocated byte length table 733 (FIG. 7: (2)), allocates a time slot corresponding to the byte length 902 allocated to each TCONT at every grant period, creates a transmission timing table 734 in which the ONU-ID and the byte length allocated within each grant period are associated and stores it in the storage part 710 (FIG. 7: (3)). Also, the transmission timing deciding part 735 transmits a transmission permission message including the grant indication 22 to each ONU 300 in accordance with the contents of the created transmission timing table 734, notifying the transmission timing of data.

FIG. 11 shows an organization example of the transmission timing table 734. The transmission timing table 734 includes the ONU-ID 901 that is the identifier of the ONU, a Start area 1002 for storing a data transmission start timing Start 28 within a certain grant period, an End area 1003 for storing a data transmission end timing End 29 and a downlink wavelength type 1004.

Each wavelength is equivalent to the bandwidth and the allocated time slot length as follows. The time slot length for each wavelength can be pre-stored in an appropriate table in the storage part 732.

Figure 8:
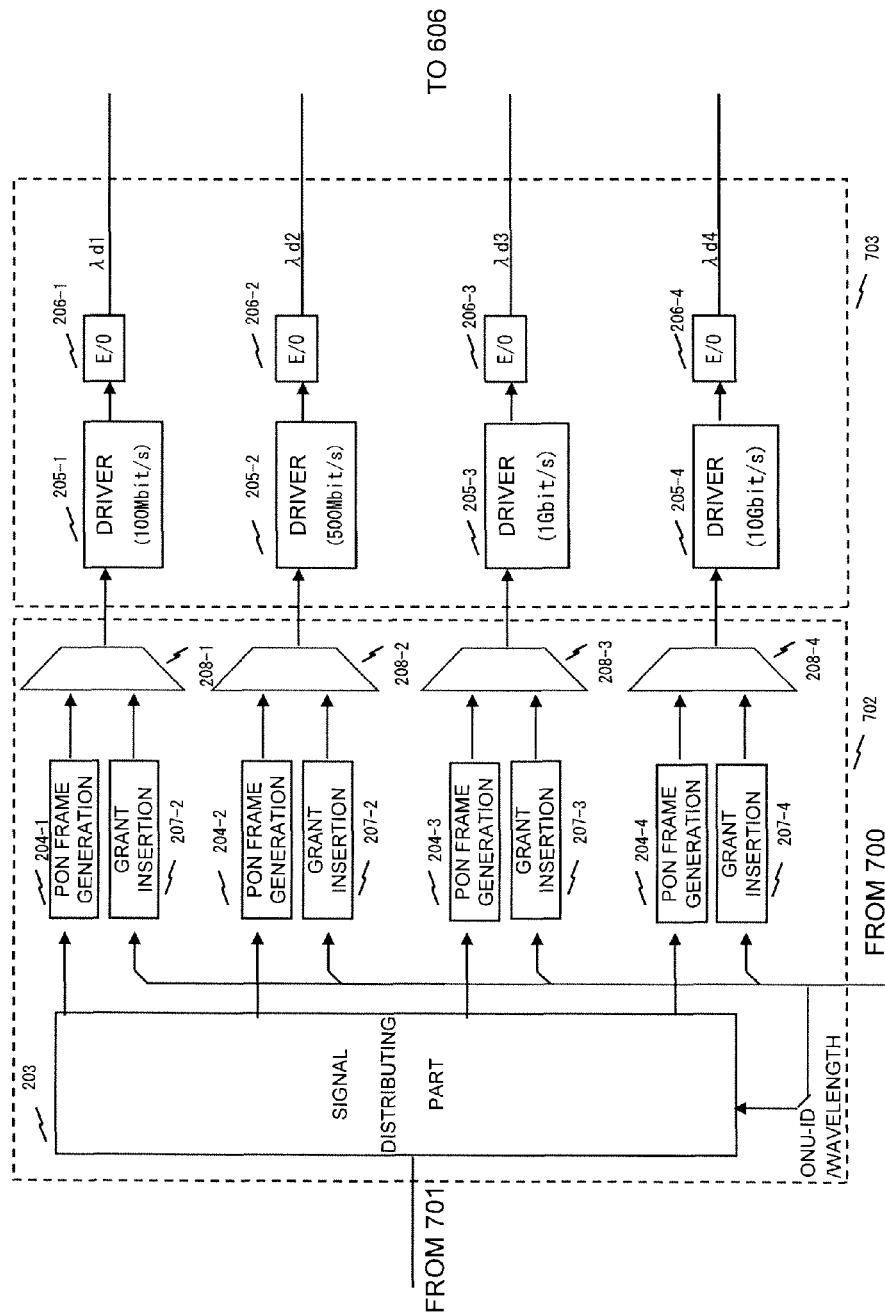
FIG. 8 is a block diagram showing a configuration example of a transmitting part of the OLT.

$\lambda u1$: wavelength for bandwidth 100 Mbit/s (correctly 103.68 Mbit/s), allocated time slot length: 1620 bytes $\lambda u2$: wavelength for bandwidth 500 Mbit/s (correctly 518.4 Mbit/s), allocated time slot length: 8100 bytes $\lambda u3$: wavelength for bandwidth 1 Gbit/s (correctly 1036.8 Mbit/s), allocated time slot length: 16200 bytes $\lambda u4$: wavelength for bandwidth 10 Gbit/s (correctly 10368 Mbit/s), allocated time slot length: 162000 bytes FIG. 8 is a detailed block diagram for the downlink signal processing part and the optical sending interface.

Figure 15:
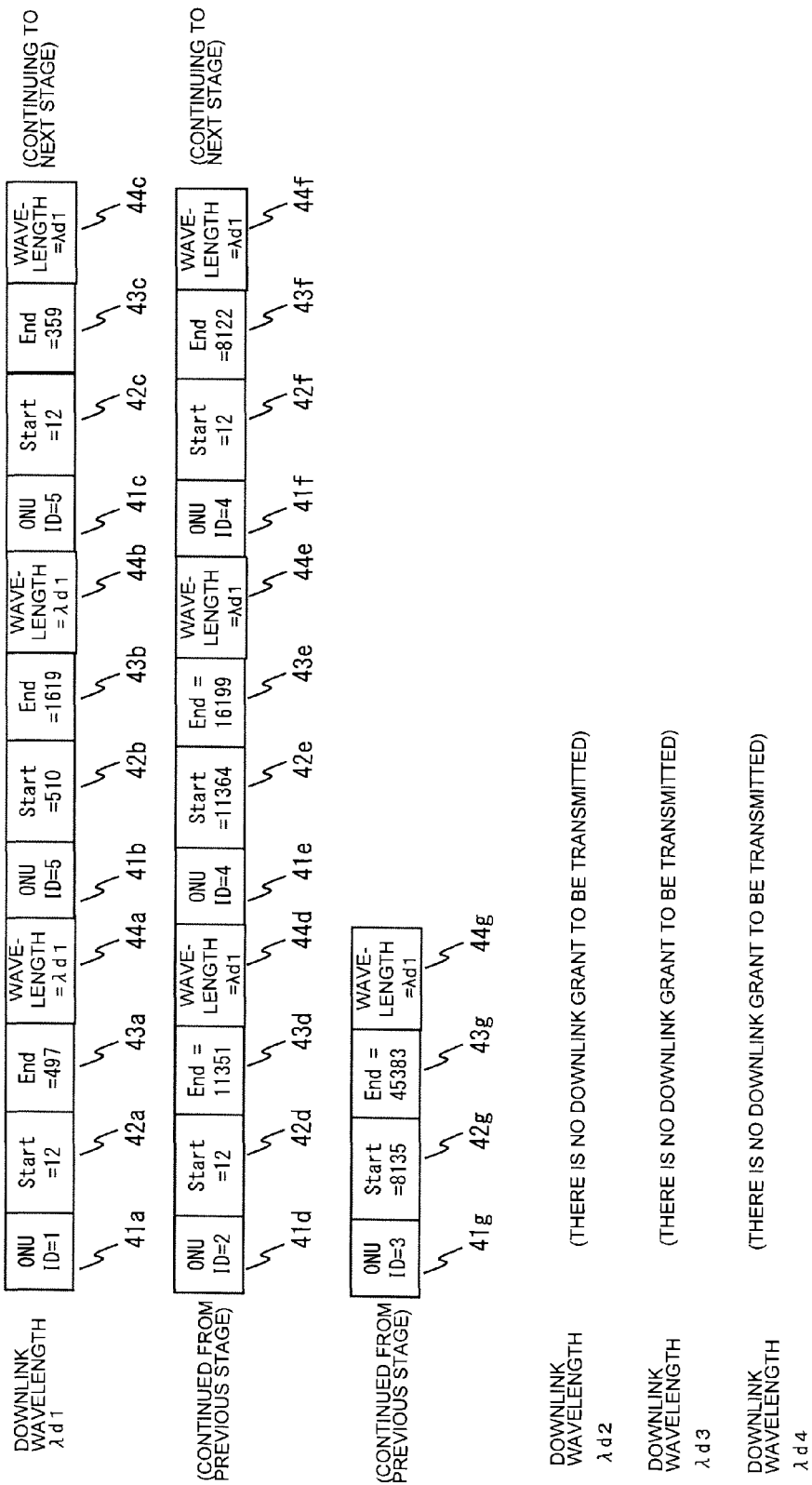
FIG. 15($a$) is a view showing a transmitting example (first period) of a downstream grant at each wavelength.
Figure 15:
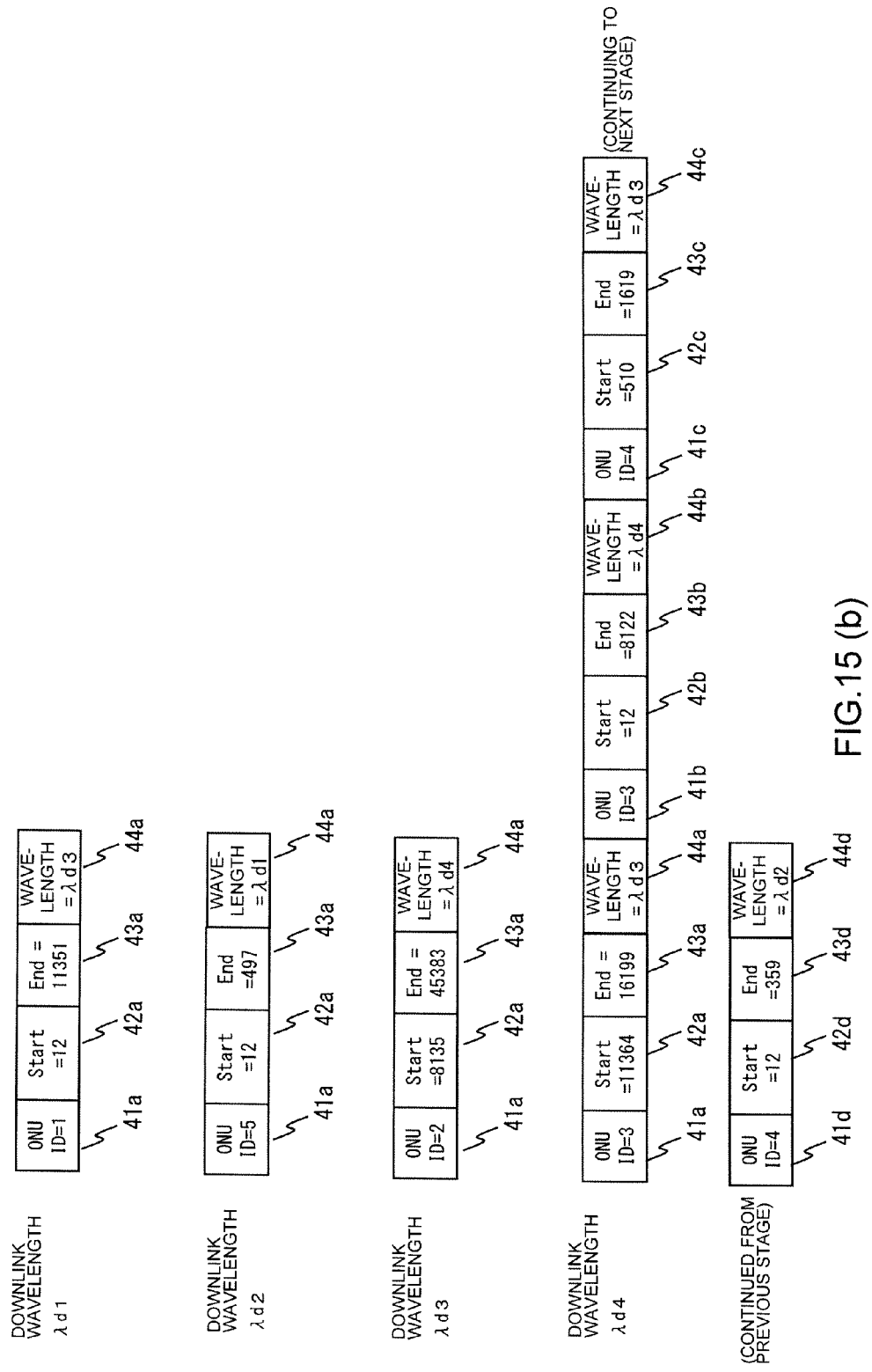
Figure 16:
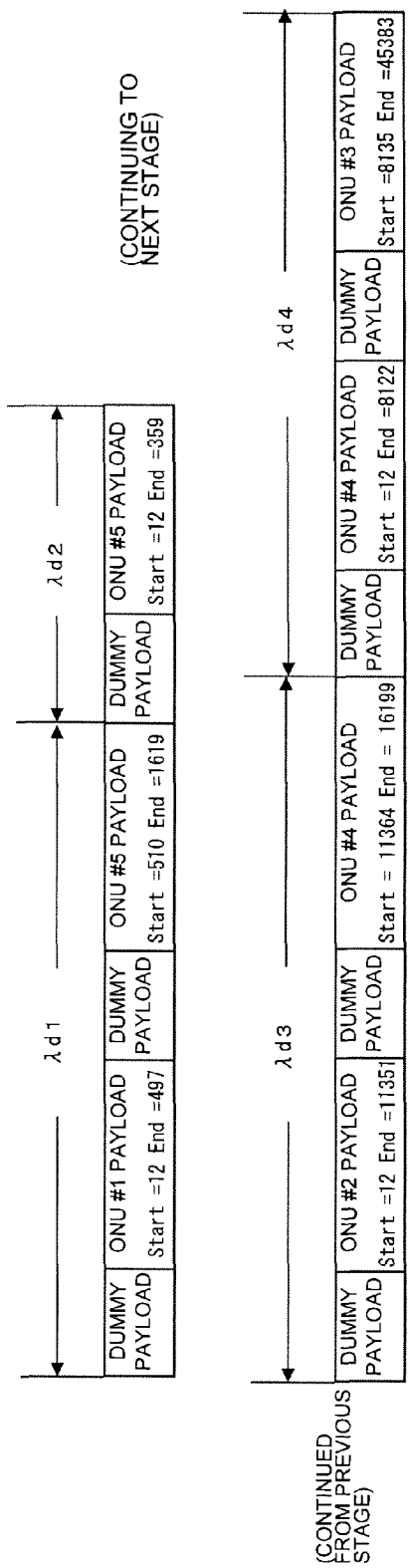
FIG. 16 is a view showing an example of frame payload.

A downlink signal from the downlink data buffer 701 is distributed for each transmitting wavelength in a signal distributing part 203, and a packet signal is transferred to a corresponding block of the PON frame generating parts 204-1 to 204-4. When the number of wavelengths that the OLT 200 uses for transmission is four, the four PON frame generating parts 204, four grant inserting parts 207, four multiplexing parts 208, four drivers 205, and four E/Os 206 are provided, as described in this embodiment. The PON frame generating part 204 assembles the frame in a format as shown in FIG. 2, based on the PLOAM information 22 notified from the control part 700 and the frame payload 24 from the signal distributing part 203. Particularly, the uplink grant indication and the downlink grant indication generated in the control part 700 are inserted into the signal of the corresponding wavelength in the grant inserting part 207, and multiplexed with the signal of the PON frame generating part 204 in the multiplexing part 208. Herein, into which wavelength the uplink grant indication and the downlink grant indication are inserted correspondingly will be described later using FIG. 15. The assembled signal is converted from electrical signal into optical signal as the driver 205 current drives the E/O 206 and transmitted via the WDM part 606 to the trunk fiber 110.

Figure 9:
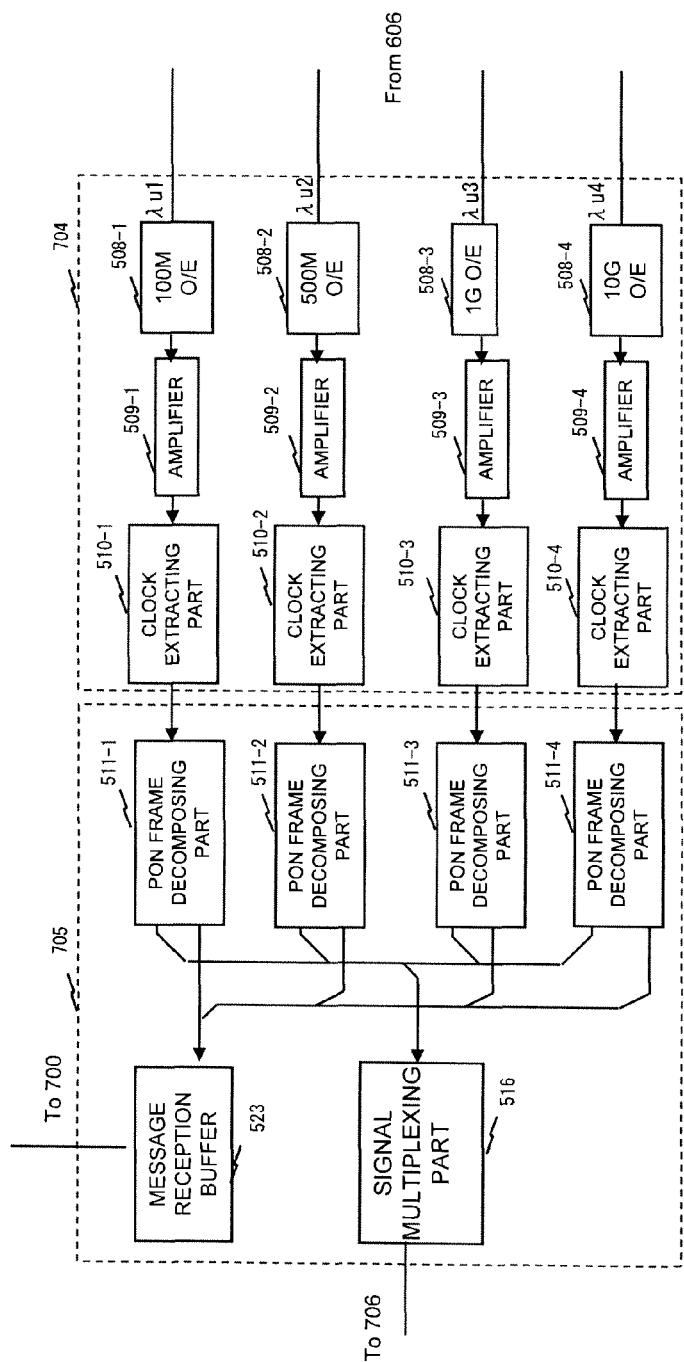
FIG. 9 is a block diagram showing a configuration example of a receiving part of the OLT.

FIG. 9 is a detailed block diagram of the optical receiving interface and the uplink signal processing part.

In this example, an instance of using the four wavelengths, including wavelength for 100 Mbit/s, wavelength for 500 Mbit/s, wavelength for 1 Gbit/s, and wavelength for 10 Gbit/s is taken for explanation, whereby four O/Es 508, four amplifiers 509, four clock extracting parts 510, and four PON frame decomposing parts 511 are provided within the OLT 200. The optical signal received via the optical signal IF part 606 is converted into the electrical signal in the O/E 508, amplified in the amplifier 509, and retimed in the clock extracting part 510, whereby an overhead is separated by the PON frame decomposing part 511, and the packet is sent to a signal multiplexing part 516 and to the uplink data buffer 706. A message receiving buffer 523 stores the control signal (PLOAM, queue length) required for the process in the control part 700 as described in connection with FIG. 3, and transfers it to the control part 700.

4. Wavelength Allocation

Figure 10:
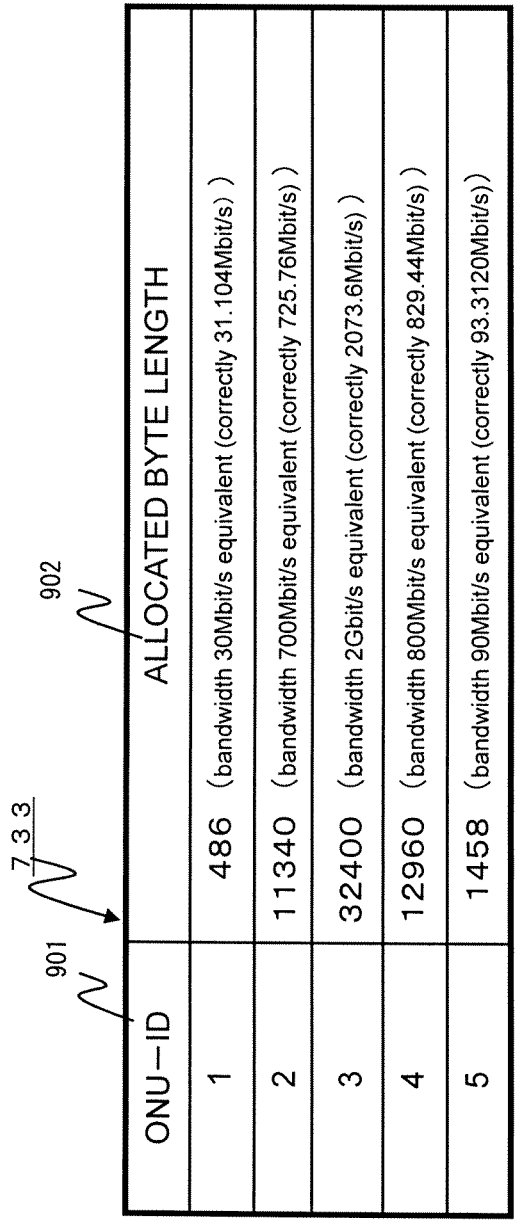
FIG. 10($a$) is a memory organization view showing an organization example of an allocated byte length table.
Figure 10:
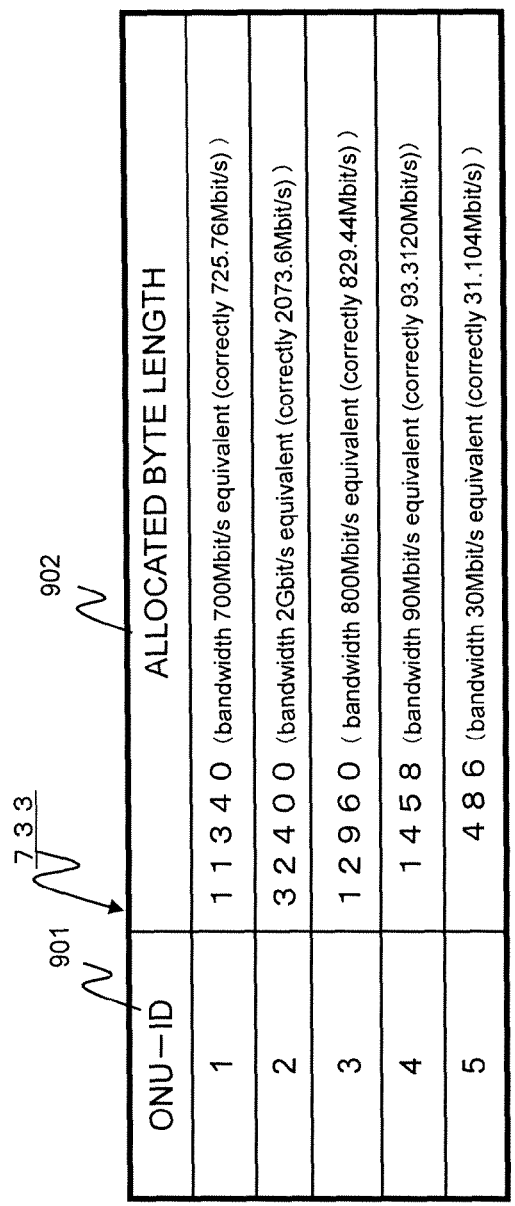

FIG. 10(*a*) shows the allocated byte length table 733 (first period), as one example, in the case which as a result of performing a downlink bandwidth control process in the downlink bandwidth control part 708 within the OLT 200 as described in connection with FIG. 7, the allocated byte length of 486 bytes (bandwidth 30 Mbit/s (correctly 31.104 Mbit/s)) is allocated to the ONU #1, the allocated byte length of 11340 bytes (bandwidth 700 Mbit/s (correctly 725.76 Mbit/s)) is allocated to the ONU #2, the allocated byte length of 32400 bytes (bandwidth 2 Gbit/s (correctly 2073.6 Mbit/s)) is allocated to the ONU #3, the allocated byte length of 12960 bytes (bandwidth 800 Mbit/s (correctly 829.44 Mbit/s)) is allocated to the ONU #4, and the allocated byte length of 1458 bytes (bandwidth 90 Mbit/s (correctly 93.312 Mbit/s)) is allocated to the ONU #5, transmitting the downlink signal. Further, FIG. 10(*b*) shows an example of the allocated byte length table 733 (second period) as a result of performing the next downlink bandwidth control process following the process of FIG. 10(*a*).

FIG. 11(*a*) shows an example of the transmission timing table 734 (first period) created using the allocation table of FIG. 10(*a*).

This transmission timing table 734 shows a case of allocating the allocated bandwidths in ascending order of the bandwidth so that the allocated bandwidth may be smaller than the maximum bandwidth set for each wavelength.

Figure 13:
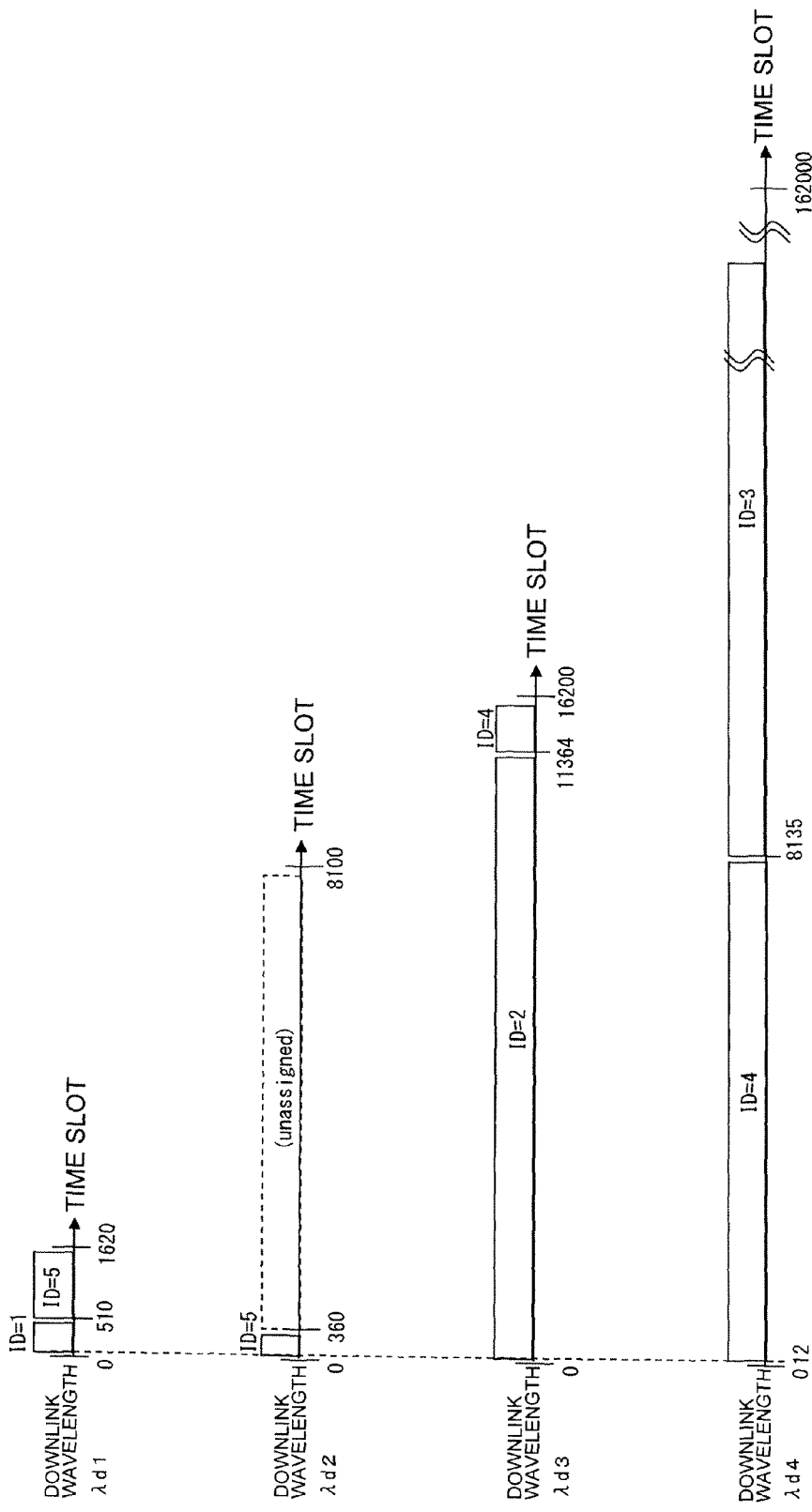
FIG. 13 is a chart showing an allocation operation example of a downstream wavelength.

FIG. 13 shows a downlink time slot chart for each downlink wavelength in the example of the transmission timing table 734 of FIG. 11(*a*). In this example, the order of allocating the downlink wavelengths is ascending order of the bandwidth. Also, in this example, it is assumed that $\lambda u1$ is the wavelength for bandwidth 100 Mbit/s, $\lambda u2$ is the wavelength for bandwidth 500 Mbit/s, $\lambda u3$ is the wavelength for bandwidth 1 Gbit/s, and $\lambda u4$ is the wavelength for bandwidth 10 Gbit/s. In FIG. 13, the allocated time slot length for each wavelength is shown, and the wavelength and transmission timing (transmission time slot) of the downlink signal to the ONU of each ONU-ID are represented. In this allocation example, the downlink wavelength operable at lower rate clock (lower bandwidth) is allocated to the ONU-ID (e.g., ONU-ID=1 and 5) with smaller allocated bytes (bandwidth). Also, the downlink wavelength operable at higher rate clock (higher bandwidth) is allocated to the ONU-ID (e.g., ONU-ID=2, 3, and 4) with greater allocated bytes (bandwidth). And in this example, at each ONU-ID, the downlink wavelength is not allocated at the same time (overlapping the same transmission time slot or transmission timing). In this way, for the ONU in which the bandwidth equal to the bandwidth set for the wavelength (e.g., 100 Mbit/s for $\lambda u1$) or greater is allocated, that wavelength is not allocated, but the next wavelength is allocated, whereby the above problems are solved. That is, in the ONU with ONU-ID=5, for example, the wavelength $\lambda u1$ is used in the time slots 510 to 1619, and the wavelength $\lambda u2$ is used in the time slots 12 to 359, whereby only one allocated wavelength exists in a certain time slot.

5. Transmission Timing Table Generation Process

Figure 14:
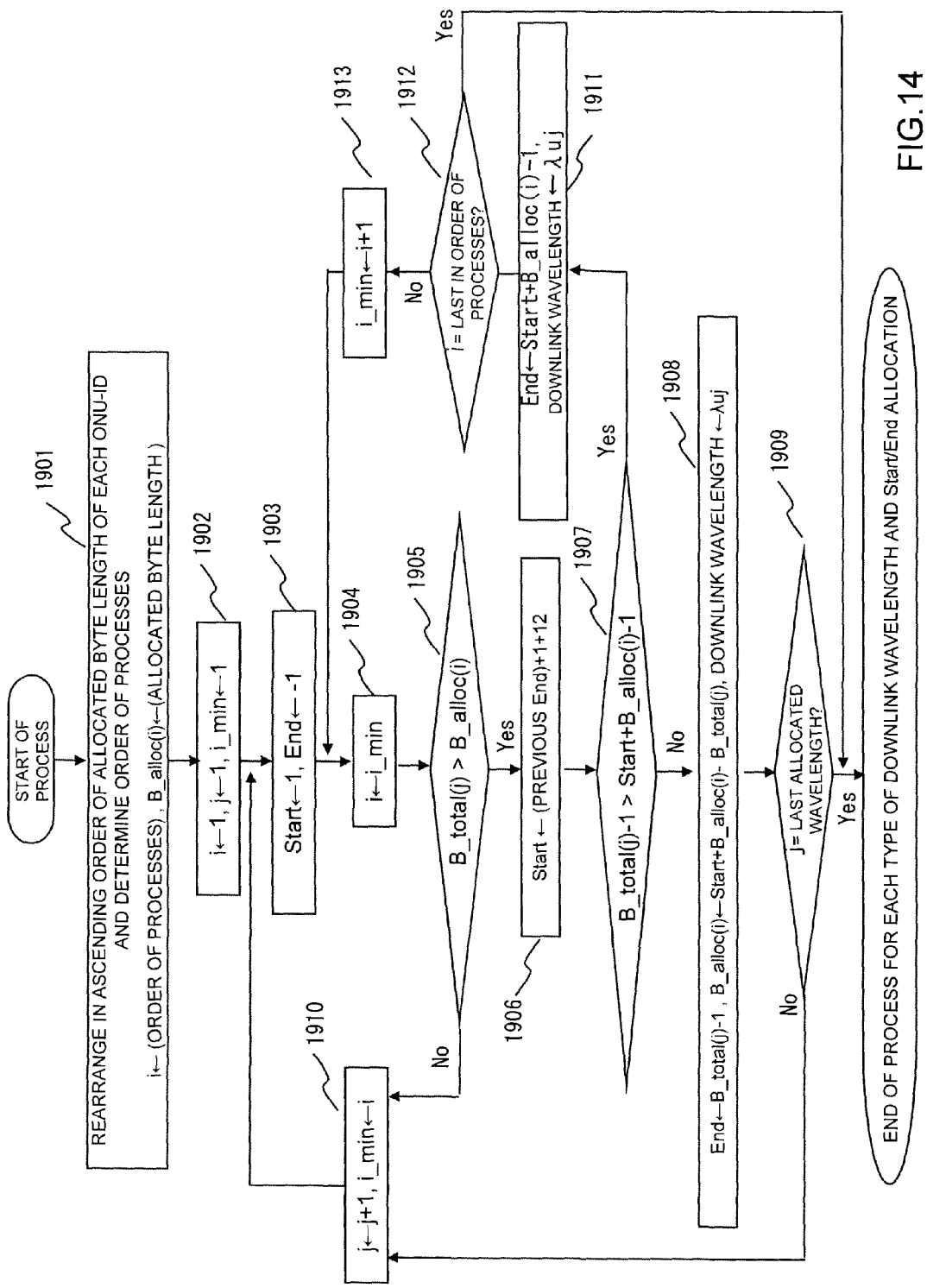
FIG. 14 is an operation flowchart showing an operation example (No. 2) of the control part of the OLT.

FIG. 14 shows a flowchart for a method for deciding the type of downlink wavelength and Start/End.

In an example of FIG. 14, a process for generating the transmission timing table 734 of FIG. 11(*a*) using the allocated byte length table 733 of FIG. 10(*a*) is shown.

A creation method for the transmission timing table 734 will be described below.

In allocating the downlink wavelength, the signal is transmitted to the ONUs in ascending order of the requested bandwidth by sequentially using the wavelengths in ascending order of transmission rate among plural transmitting wavelengths that the OLT itself has as a transmitting function. At this time, the wavelength to be allocated must be selected so that the bandwidth allocated to each ONU is narrower than a maximum bandwidth through which transmission is enabled at the allocated wavelength. This reason is that since the variable WDM filter mounted on the ONU can select only one wavelength at the same time, as previously described, this is a measure for preventing the wavelength allocation over plural wavelengths at the same time. This flowchart, regarding the downlink wavelength type and the Start/End deciding method, is performed by, for example, the control part 700, or particularly the transmission timing deciding part 735.

First of all, the transmission timing deciding part 735 rearranges the allocated byte length table 733 of FIG. 10 in ascending order of the allocated byte length by referring to it, and determines the order of processes, whereby i is made a processing order 1801 and B_alloc(i) is made the allocated byte length 902 (1901).

FIG. 17 shows a table in which the data of the allocated byte length table of FIG. 10 is rearranged in ascending order of the byte length. The transmission timing deciding process is performed for the ONU-ID 901 in ascending order of processes 1801. The rearranged table may be stored in another area of the allocated byte length table 733, or overwritten on it. For the allocated byte length 902, i is set to 1, j indicating the type of downlink wavelength is set to 1 and i_min is set to 1 at the initialization of the processing flow (1902). The transmission timing deciding part 735 sets Start to 1 and End to −1 at the initialization of Start and End (1903).

The transmission timing deciding part 735 substitutes i_min into i (1904). B_total (j) is the length of time slot for each wavelength, in which B_total(1) of λu1 is 1620 bytes, B_total (2) of λu2 is 8100 bytes, B_total(3) of λu3 is 16200 bytes, and B_total (4) of λu4 is 162000 bytes in this embodiment. The time slot length for each wavelength is pre-stored in an appropriate storage area of the storage part 732, whereby the transmission timing deciding part 735 can obtain B_total(j) by referring to it. The transmission timing deciding part 735 compares B_total(j) and B_alloc(i) (1905), in which if B_total(j) is larger, Start is decided by substituting (previous End value)+1+12 into Start (1906). If B_total(j) is smaller, the transmission timing deciding part 735 increments j by 1, and substitutes i into i_min (1910), whereby the operation returns to step 1903. After deciding the Start (1906), the transmission timing deciding part 735 compares B_total(j)−1 and Start+B_alloc(i)−1 (1907), in which if B_total(j)−1 is greater, End is decided by substituting Start+B_alloc(i)−1 into End (1911), and the downlink wavelength is decided as λuj. The transmission timing deciding part 735 ends the process if i is the last order of processes at the subsequent step 1912, or substitutes i+1 into i_min (1913), if i is not the last order of processes, whereby the operation returns to step 1904. The transmission timing deciding part 735 substitutes B_alloc (i)−1 into End, substitutes start+B_alloc(i)−1 (1911) to decide End (1908), if B_total(j)−1 is smaller at comparison step 1907. At the same time, the transmission timing deciding part 735 substitutes Start+B_alloc(i)−B_total(j) into B_alloc (i) (1908), and decides the downlink wavelength as λuj (1908). Thereafter, the transmission timing deciding part 735 ends the process, if j is the last allocated wavelength at step 1909, or increments j by 1 and substitutes i into i_min (1910), if j is not the last allocated wavelength, whereby the operation returns to step 1903. In the process, +1, +12 is the byte length between Start/End of data or from data to data such as guard time, and may be preset to an appropriate value. The transmission timing deciding part 735, after setting the data such as Start, End and downlink wavelength at each of the above steps, stores those data in applicable columns of ONU-ID in the transmission timing table 734 at an appropriate timing.

Referring to a flowchart of FIG. 14, an example of allocation as in FIGS. 11(a) and 13 will be described below using the table of FIG. 10(a).

First of all, at the processing order i=1, the allocated byte length 486 of ONU-ID=1 is compared with the time slot length 1620 of λu1 through steps 1901 to 1905, and at step 1906, Start='12'. Further, at step 1907,

1620>12+486−1 whereby at step 1911, End='497' and the downlink wavelength is set to λu1.

After processing at steps 1912 and 1913, at the processing order i=2, the allocated byte table 1458 of ONU-ID=5 is compared with the time slot length 1620 of λu1 through steps 1904 and 1905, and at step 1906, Start='510' (=497+1+12). Further, at step 1907,

1620−1<510+1458−1 whereby at step 1908, End='1619' and the downlink wavelength is set to λu1. Further, for the remaining allocated byte length (B_alloc(i)=510+1458−1620=348), the wavelength is changed to λu2 through step 1910, whereby through steps 1903 to 1906, Start='12' and the downlink wavelength is set to λu2, and further through steps 1907 to 1911, End=12+348−1='359' and the downlink wavelength is set to λu2.

Similarly, the same process is repeated for the processing order i=3 and beyond.

FIG. 11(b) is an example of the transmission timing table created using the allocation table of the second period as shown in FIG. 10(b).

FIG. 15(a) shows an example of how the transmission timing deciding part 735 stores the contents of the transmission timing table of the first period as shown in FIG. 11(a) in the downlink grant area 31 as described in connection with FIG. 2. In this example, each of the four downlink wavelengths for use is transmitted in a frame format as described in connection with FIG. 2, and accordingly the downlink grant area 31 is provided for each wavelength. At the top of frame, or the timing immediately before the frame alignment pattern 21 as described in connection with FIG. 2, each ONU 300 receives the signal by selecting one wavelength through the wavelength variable filter 302 as described in connection with FIG. 3, whereby it is natural that the grant signal 23 to be transmitted subsequently to the concerned ONU is also transmitted using the wavelength selected at the timing immediately before the frame alignment pattern 21. Specifically, supposing that all the ONUs select the downlink wavelength λd1 at the zeroth period where the transmission of the downlink signal is not yet started, all the grant signals at the following first period are transmitted using the downlink wavelength λd1. The transmission timing deciding part 735 stores the grant signals addressed to the ONU #1 in areas 41a to 44a, and the grant signals addressed to the ONU #5 in areas 41b to 44b and 41c to 44c, specifically based on the sequence of the transmission timing table of FIG. 11(a) by referring to the transmission timing table 734. Herein, the reason why two sets of downlink grant areas are used for the grant signals addressed to the ONU #5 is that two wavelengths are not used at the same time, as shown in FIG. 14, and the transmission rate is selected to have as small electric power to be consumed as possible by using them in sequence. In the following, the transmission timing deciding part 735 similarly stores the grant signals addressed to the ONU #2 in areas 41d to 44d, the grant signals addressed to the ONU #4 in areas 41e to 44e and 41f to 44f, and the grant signals addressed to the ONU #3 in areas 41g to 44g. Also, the transmission timing deciding part 735 does not store the grant signals at the remaining wavelengths λd2, λd3 and λd4.

FIG. 17 is a view showing an example of the frame payload.

In this way, the frame payload 24 is transmitted by switching the wavelength in accordance with the wavelength 44, Start 42 and End 43 of the payload as indicated by the grant signal of the first period. Each ONU receives the payload by switching the wavelength in accordance with the grant indication of FIG. 15(a).

Subsequently, FIG. 15(b) shows an example of how the transmission timing deciding part 735 stores the contents of the transmission timing table of the second period as shown in FIG. 11(b) in the downlink grant area 31 as described in connection with FIG. 2. At the timing when the transmission of the first period as above is ended (i.e., timing immediately before the frame alignment pattern 21 of the second period), the ONU #1 selects the wavelength λd1 in accordance with the downlink grant signal as described in connection with FIG. 15(a). Similarly, the ONU #2 selects the wavelength λd3, the ONU #3 selects the wavelength λd4, the ONU #4 selects the wavelength λd4, and the ONU #5 selects the wavelength λd2 (Since the ONU #4 receives the payload of the downlink wavelength λd4 in accordance with the downlink grant indication after receiving the payload of the downlink wavelength λd3, the wavelength is set to λd4. Also, since the ONU #5 receives the payload of the downlink wavelength λd2 in accordance with the downlink grant indication after receiving the payload of the downlink wavelength λd1, the wavelength is set to λd2.) Accordingly, to transmit the grant signal of the second period, those wavelengths are used. Specifically, the transmission timing deciding part 735 stores the grant signal addressed to the ONU #1 in the areas 41a to 44a at the wavelength λd1. The transmission timing deciding part 735 stores the grant signal addressed to the ONU #5 in the areas 41a to 44a at the wavelength λd2. The transmission timing deciding part 735 stores the grant signal addressed to the ONU #2 in the areas 41a to 44a at the wavelength λd3. The transmission timing deciding part 735 stores the grant signal addressed to the ONU #3 in the areas 41a to 44a and 41b to 44b at the wavelength λd4, and stores the grant signal addressed to the ONU #4 in the areas 41c to 44c and 41d to 44d.

INDUSTRIAL APPLICABILITY

The invention is usable in a PON system, for example, but may be additionally applied to a system in which the downlink wavelength is allocated to each terminal or terminal device.

DESCRIPTION OF REFERENCE NUMERALS

10 PON
100 splitter
110, 120 optical fiber
300 ONU
400, 410 terminal
700 control part
708 downlink bandwidth control part
735 transmission timing deciding part
733 allocated byte length table
734 transmission timing table

The invention claimed is:

1. An optical multiplexing terminal device in a wavelength multiplexing passive optical network system in which the optical multiplexing terminal device connected to an upper-level communication network and a plurality of optical network terminal devices for accommodating subscriber terminals are connected via an optical fiber network having an optical splitter and a plurality of optical fibers, communication in a direction from the optical multiplexing terminal device to the optical network terminal devices being made using a plurality of wavelengths fewer in number than a total number of the optical network terminal devices connected to the optical multiplexing terminal device, the optical multiplexing terminal device comprising:
a transmission timing table for storing, for each optical network terminal device ID, a type of downlink wavelength, a start position of transmission timing, and an end position of transmission timing;
an allocated byte length table for storing an allocated byte length indicating an amount of data allocated to each optical network terminal device for each optical network terminal device ID; and
a control part configured to allocate the type of downlink wavelength and the transmission timing to each optical network terminal device by referring to the transmission timing table and the allocated byte length table;
wherein
the control part is configured to decide a quantity of signal permitted to transmit to each of the optical network terminal devices at every fixed period, with a total sum of transmission rates corresponding to the plurality of wavelengths for use in the communication in the direction from the optical multiplexing terminal device to the optical network terminal devices as an upper limit, to select the wavelength in which the corresponding transmission rate is the slowest from among the wavelengths of which bandwidth allocation is not completed and allocates the transmission timing to the optical network terminal devices in ascending order of the decided quantity of signal permitted to transmit, and to store, for the optical network terminal device ID, a start position of transmission timing and an end position of transmission timing along with a type of downlink wavelength for the selected wavelength in the transmission timing table;
the control part is configured to create a downlink grant indication, successively including a data set having the type of downlink wavelength, the start position of transmission timing and the end position of transmission timing for the optical network terminal device ID of each entry by referring to the transmission timing table, and to create a frame payload including transmit data from the start position to the end position of transmission timing to the designated optical network terminal device for each data set of the downlink grant indication; and
the control part is configured to transmit the downlink grant indication to each optical network terminal device with the wavelength selected by each optical network terminal device in accordance with a downlink grant indication transmitted at a previous transmission period, and to subsequently transmit a downlink signal including the frame payload at the wavelength with the type of downlink wavelength designated by the downlink grant indication by successively switching the wavelengths.

2. The optical multiplexing terminal device according to claim 1, wherein the control part is configured to:
rearrange the allocated byte length table in ascending order of the allocated byte length for each optical network terminal device ID by referring to the allocated byte length table and determine the order of processes;
select the type of downlink wavelength in ascending order of a time slot length corresponding to the wavelength for the optical network terminal device ID in ascending order of processes by referring to the allocated byte length table;
compare the time slot length corresponding to the selected type of downlink wavelength with the allocated byte length of the optical network terminal device ID read from the allocated byte length table;
allocate the type of wavelength as a first wavelength type when the time slot length of the selected type of wavelength is greater than the allocated byte length of the optical network terminal device ID, allocate the wavelength in which the time slot length is greater than the selected type of wavelength and the time slot length is greater than the allocated byte length of the optical network terminal device ID as the first wavelength type when the time slot length of the selected type of wavelength is smaller than the allocated byte length of the optical network terminal device ID;
set a start position and an end position of a transmission time slot, and store, associated with the optical network terminal device ID, the start position and the end position along with a first downlink wavelength type in the transmission timing table, when all of the allocated byte lengths are allocated within the time slot length in which the transmission time slot is not allocated with the first wavelength type; and
when all of the allocated byte lengths are not allocated within the time slot length in which the transmission time slot is not allocated with the first wavelength type, allocate the byte length to be allocated within the time slot length of the first downlink wavelength type, set a start position and an end position of the transmission time slot, and store, associated with the optical network terminal device ID, the start position and the end position along with the first downlink wavelength type in the transmission timing table, and further, within the time slot length of a second wavelength type in which the time slot length is next greater than the first downlink wavelength type and the transmission time slot is not yet allocated, allocate the remaining allocated byte length, set a start position and an end position of the transmission time slot, and store the start position and the end position along with a second downlink wavelength type in the transmission timing table associated with the optical network terminal device ID.

3. The optical multiplexing terminal device according to claim 1, wherein the control part is further configured to insert a dummy payload for switching the wavelengths before the data set for each optical network terminal device of the frame payload.

4. The optical multiplexing terminal device according to claim 1, wherein the control part is further configured to compare a transmission permitted data amount with a preset contract parameter, in which, when the contract parameter is greater than a transmission wait data amount, the control part is configured to set the contract parameter to the allocated byte length, and write the allocated byte length into the allocated byte length table, when a transmission wait data amount is greater than the contract parameter, the control part is configured to set the transmission wait data amount to the allocated byte length, and write the allocated byte length into the allocated byte length table.

5. The optical multiplexing terminal device according to claim 1, wherein the control part is further configured to compare a transmission permitted quantity of signal with a maximum quantity of signal transmittable at a transmission rate corresponding to a transmission wavelength at the every fixed period, in which, only when the transmission permitted quantity of signal is not greater than the maximum quantity of signal transmittable, the control part is configured to allocate the transmission timing using the wavelength used in the comparison.

6. A wavelength multiplexing passive optical network system in which an optical multiplexing terminal device connected to an upper-level communication network and a plurality of optical network terminal devices for accommodating subscriber terminals are connected via an optical fiber network having an optical splitter and a plurality of optical fibers, communication in a direction from the optical multiplexing terminal device to the optical network terminal devices being made using a plurality of wavelengths fewer in number than a total number of the optical network terminal devices connected to the optical multiplexing terminal device, the optical multiplexing terminal device comprising:
a transmission timing table for storing, for each optical network terminal device ID, a type of downlink wavelength, a start position of transmission timing, and an end position of transmission timing;
an allocated byte length table for storing an allocated byte length indicating an amount of data allocated to each optical network terminal device for each optical network terminal device ID; and
a control part configured to allocate the type of downlink wavelength and the transmission timing to each optical network terminal device by referring to the transmission timing table and the allocated byte length table;
wherein
the control part is configured to decide a quantity of signal permitted to transmit to each of the optical network terminal devices at every fixed period with a total sum of transmission rates corresponding to the plurality of wavelength for use in the communication in the direction from the optical multiplexing terminal device to the optical network terminal devices as an upper limit, to select the wavelength in which the corresponding transmission rate is the slowest from among the wavelengths of which bandwidth allocation is not completed and allocates the transmission timing to the optical network terminal devices in ascending order of the decided quantity of signal permitted to transmit, and to store, for the optical network terminal device ID, a start position of transmission timing and an end position of transmission timing table along with a type of downlink wavelength for the selected wavelength in the transmission timing table;
the control part is configured to create a downlink grant indication, successively including a data set having the type of downlink wavelength, the start position of transmission timing and the end position of transmission timing for the optical network terminal device ID of each entry by referring to the transmission timing table, and to create a frame payload including transmit data from the start position to the end position of transmission timing to the designated optical network terminal device for each data set of the downlink grant indication;
the control part is configured to transmit the downlink grant indication to each optical network terminal device with the wavelength selected by each optical network terminal device in accordance with a downlink grant indication transmitted at a previous transmission period, and to subsequently transmit a downlink signal including the frame payload at the wavelength with the type of downlink wavelength designated by the downlink grant indication by successively switching the wavelength; and
wherein the optical network terminal device is configured to receives a downlink signal from the optical multiplexing terminal device, to switch receiving wavelengths in accordance with a downlink grant indication included in the downlink signal, and to receive the frame payload to the self optical network terminal device.

7. A downlink wavelength transmission method in a wavelength multiplexing passive optical network system in which an optical multiplexing terminal device connected to an upper-level communication network and a plurality of optical network terminal devices for accommodating subscriber terminals are connected via an optical fiber network having an optical splitter and a plurality of optical fibers, communication in a direction from the optical multiplexing terminal device to the optical network terminal devices being made using a plurality of wavelengths fewer in number than a total number of the optical network terminal devices connected to the optical multiplexing terminal device, the optical multiplexing terminal device comprising a transmission timing table, an allocated byte length table, and a control part, wherein the transmission timing table stores, for each optical network terminal device ID, a type of downlink wavelength, a start position of transmission timing, and an end position of transmission timing, and the allocated byte length table stores an allocated byte length indicating an amount of data allocated to each optical network terminal device for each optical network terminal device ID, the downlink wavelength transmission method comprising:

allocating, by the control part, the type of downlink wavelength and the transmission timing to each optical network terminal device by referring to the transmission timing table and the allocated byte length table;

deciding, by the control part, a quantity of signal permitted to transmit to each of the optical network terminal devices at every fixed period, with a total sum of transmission rates corresponding to the plurality of wavelengths for use in the communication in the direction from the optical multiplexing terminal device to the optical network terminal devices as an upper limit, selecting, by the control part, the wavelength in which the corresponding transmission rate is the slowest from among the wavelengths of which bandwidth allocation is not completed and allocates the transmission timing to the optical network terminal devices in ascending order of the decided quantity of signal permitted to transmit, and storing, by the control part, for the optical network terminal device ID, a start position of transmission timing and an end position of transmission timing along with a type of downlink wavelength for the selected wavelength in the transmission timing table;

creating, by the control part, a downlink grant indication, successively including a data set having the type of downlink wavelength, the start position of transmission timing and the end position of transmission timing for the optical network terminal device ID of each entry by referring to the transmission timing table, and creating, by the control part, a frame payload including transmit data from the start position to the end position of transmission timing to the designated optical network terminal device for each data set of the downlink grant indication; and transmitting, by the control part, the downlink grant indication to each optical network terminal device with the wavelength selected by each optical network terminal device in accordance with a downlink grant indication transmitted at a previous transmission period, and subsequently transmitting, by the control part, a downlink signal including the frame payload at the wavelength with the type of downlink wavelength designated by the downlink grant indication by successively switching the wavelengths.

\* \* \* \* \*